(12) United States Patent
Vellanti

(10) Patent No.: US 11,587,045 B2
(45) Date of Patent: Feb. 21, 2023

(54) METHODS AND SYSTEMS TO FACILITATE ORGANIZED SCHEDULING OF TASKS

(71) Applicants: Calooper LLC, Homestead, FL (US); Regina A. Vellanti, Homestead, FL (US)

(72) Inventor: Regina A. Vellanti, Homestead, FL (US)

(73) Assignee: CALOOPER LLC, Homestead, FL (US)

(*) Notice: Subject to any disclaimer, the term of this patent is extended or adjusted under 35 U.S.C. 154(b) by 0 days.

(21) Appl. No.: 17/671,485

(22) Filed: Feb. 14, 2022

(65) Prior Publication Data

US 2022/0261769 A1 Aug. 18, 2022

Related U.S. Application Data

(60) Provisional application No. 63/291,576, filed on Dec. 20, 2021, provisional application No. 63/238,921, (Continued)

(51) Int. Cl.
*G06Q 10/10* (2012.01)
*G06Q 30/02* (2012.01)
(Continued)

(52) U.S. Cl.
CPC ..... *G06Q 10/1097* (2013.01); *G06Q 30/0241* (2013.01)

(58) Field of Classification Search
CPC .......................................... G06Q 10/00–50/00
(Continued)

(56) References Cited

U.S. PATENT DOCUMENTS

| 6,442,527 | B1* | 8/2002 | Worthington | G06Q 10/1097 |
| | | | | 705/7.19 |
| 6,675,165 | B1* | 1/2004 | Rothschild | G06F 16/9537 |
| | | | | 707/769 |

(Continued)

FOREIGN PATENT DOCUMENTS

CN 107924552 A 4/2018

OTHER PUBLICATIONS

Facebook Events/Groups, Retrieved from Internet, Retrieved on Sep. 28, 2019 <URL: https://gadgets.ndtv.com/social-networking/news/facebook-redesigns-events-adds-read-receipts-to-groups-242636>.

(Continued)

*Primary Examiner* — Alan S Miller

(57) ABSTRACT

A system to facilitate organized scheduling of a plurality of tasks comprises a communication device, a processing device, and a storage device. The communication device may be configured for receiving at least one schedule request from at least one first user device. The processing device may be configured for analyzing the at least one schedule request to identify a schedule type. The processing device may be configured for retrieving at least one task preset associated with the plurality of categories of the schedule type. The communication device may be further configured for transmitting the at least one task preset and receiving at least one task preset selection associated with the at least one task preset. The processing device may be further configured for generating at least one schedule reminder based on the at least one task preset selection. A corresponding method is also provided.

18 Claims, 13 Drawing Sheets

Related U.S. Application Data filed on Aug. 31, 2021, provisional application No. 63/148,839, filed on Feb. 12, 2021.

(51) Int. Cl.
*G06Q 10/1093* (2023.01)
*G06Q 30/0241* (2023.01)

(58) Field of Classification Search
USPC .............................................. 705/7.11–7.42
See application file for complete search history.

(56) References Cited

U.S. PATENT DOCUMENTS

| | | | | |
|---|---|---|---|---|
| 7,634,463 | B1* | 12/2009 | Katragadda | G06Q 10/10 707/999.102 |
| 8,375,034 | B2 | 2/2013 | Norton | |
| 8,660,894 | B2* | 2/2014 | O'Sullivan | G01C 21/3476 705/14.62 |
| 9,659,260 | B2* | 5/2017 | Caligor | G06Q 10/00 |
| 10,229,422 | B2* | 3/2019 | De | G06Q 30/02 |
| 11,195,152 | B2* | 12/2021 | Gallagher | G06Q 10/1093 |
| 2002/0165753 | A1* | 11/2002 | Worthington | G06Q 10/109 705/7.19 |
| 2007/0016918 | A1* | 1/2007 | Alcorn | H04M 3/42221 725/18 |
| 2007/0214040 | A1* | 9/2007 | Patel | G06Q 30/0267 705/14.57 |
| 2008/0132252 | A1* | 6/2008 | Altman | H04W 4/021 455/457 |
| 2009/0239552 | A1* | 9/2009 | Churchill | G06F 16/9537 455/456.3 |
| 2010/0083169 | A1* | 4/2010 | Athsani | H04M 1/72403 715/764 |
| 2010/0103779 | A1* | 4/2010 | Kakirde | G06Q 10/109 455/418 |
| 2012/0102408 | A1* | 4/2012 | Zhao | G06Q 10/109 715/738 |
| 2012/0209749 | A1* | 8/2012 | Hammad | G06Q 20/326 705/27.1 |
| 2012/0239451 | A1* | 9/2012 | Caligor | G06Q 10/00 705/7.21 |
| 2014/0012574 | A1* | 1/2014 | Pasupalak | G06F 16/243 704/235 |
| 2014/0108333 | A1* | 4/2014 | Jain | H04L 67/535 707/609 |
| 2014/0278676 | A1* | 9/2014 | Burka | G06Q 10/1093 705/7.19 |
| 2014/0316937 | A1* | 10/2014 | Jiao | G06Q 30/0643 705/26.8 |
| 2015/0248664 | A1* | 9/2015 | Makhdumi | G06Q 20/3274 235/380 |
| 2015/0324752 | A1* | 11/2015 | Chen | G06Q 30/0269 705/7.19 |
| 2016/0173436 | A1* | 6/2016 | Koolwal | H04L 51/52 709/206 |
| 2016/0275458 | A1* | 9/2016 | Meushar | G06Q 10/109 |
| 2017/0046802 | A1* | 2/2017 | Zhang | G06Q 50/01 |
| 2017/0178053 | A1* | 6/2017 | Renzi | G06Q 10/06314 |
| 2017/0200128 | A1* | 7/2017 | Kumahara | H04L 67/53 |
| 2018/0025334 | A1* | 1/2018 | Pourfallah | G06Q 20/3223 705/41 |
| 2018/0025384 | A1* | 1/2018 | Tumey | G06Q 30/0266 705/14.58 |
| 2018/0081496 | A1* | 3/2018 | Bhardwaj | G06F 3/011 |
| 2018/0199156 | A1* | 7/2018 | Gandhi | H04W 4/06 |

OTHER PUBLICATIONS

Microsoft Sticky Notes, Outlook, Skype, Retrieved from Internet, Retrieved on Sep. 28, 2019 <URL: https://www.onmsft.com/feature/cheat-sheet-outlook-onenote-to-do-or-sticky-notes-microsofts-note-taking-apps-explained>.

Google Calendar, Tasks, Keep Notes, Gmail, Photos, Maps, Retrieved from Internet, Retrieved on Sep. 28, 2019 <URL: https://9to5google.com/2021/10/05/google-calendar-meeting-notes/>.

Planner & Time Manager on Clock Widget, Retrieved from Internet, Retrieved on Sep. 28, 2019 <URL: https://play.google.com/store/apps/details?id=prox.lab.calclock&hl=en_CA&gl=US>.

\* cited by examiner

METHODS AND SYSTEMS TO FACILITATE ORGANIZED SCHEDULING OF TASKS

FIELD OF THE INVENTION

The present invention relates generally to data processing. More specifically, the present invention relates to methods and systems to facilitate organized scheduling of a plurality of tasks.

BACKGROUND OF THE INVENTION

Existing techniques for organized scheduling of a plurality of tasks are deficient with regard to several aspects. For instance, the current technologies do not include a plurality of task presets associated with a schedule type. Further, the current technologies do not allow a user to interchange schedule and separate groups of people associated with a task of the plurality of tasks. Furthermore, the current technologies do not measure the time availability and unavailability associated with the user at a more accurate measure. Further, the current technologies do not allow a user to organize time associated with the plurality of tasks.

Therefore, there is a need for improved methods and systems to facilitate the organized scheduling of a plurality of tasks using a software platform that may overcome one or more of the above-mentioned problems and/or limitations.

SUMMARY OF THE INVENTION

In a first aspect of the present invention, a system to facilitate organized scheduling of a plurality of tasks is provided. The system comprises a communication device, a processing device, and a storage device. The communication device may be configured for receiving at least one schedule request from at least one first user device. In one embodiment, the at least one first user device may be associated with the at least one first user. In one embodiment, the processing device may be configured for analyzing the at least one schedule request to identify a schedule type, the schedule type comprising a plurality of categories associated with at least one task to be performed by the at least one first user. In one embodiment, the processing device may be configured for retrieving at least one task preset associated with the plurality of categories of the schedule type. The communication device may be further configured for transmitting the at least one task preset to the at least one first user device and receiving at least one task preset selection associated with the at least one task preset from the at least one first user device. The processing device may be further configured for generating at least one schedule reminder based on the at least one task preset selection. The communication device may be further configured for transmitting, based on the at least one schedule reminder, an alert to the at least one first user device.

In a second aspect of the present invention, a method to facilitate organized scheduling of a plurality of tasks is provided. The method comprises the following steps: receiving at least one schedule request from at least one first user device associated with at least one first user; analyzing the at least one schedule request to identify a schedule type, the schedule type comprising a plurality of categories associated with at least one task to be performed by the at least one first user; retrieving at least one task preset associated with the plurality of categories of the schedule type; transmitting the at least one task preset to the at least one first user device; receiving at least one task preset selection associated with the at least one task preset from the at least one first user device; generating at least one schedule reminder based on the at least one task preset selection; and transmitting, based on the at least one schedule reminder, an alert to the at least one first user device.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

Figure 1:
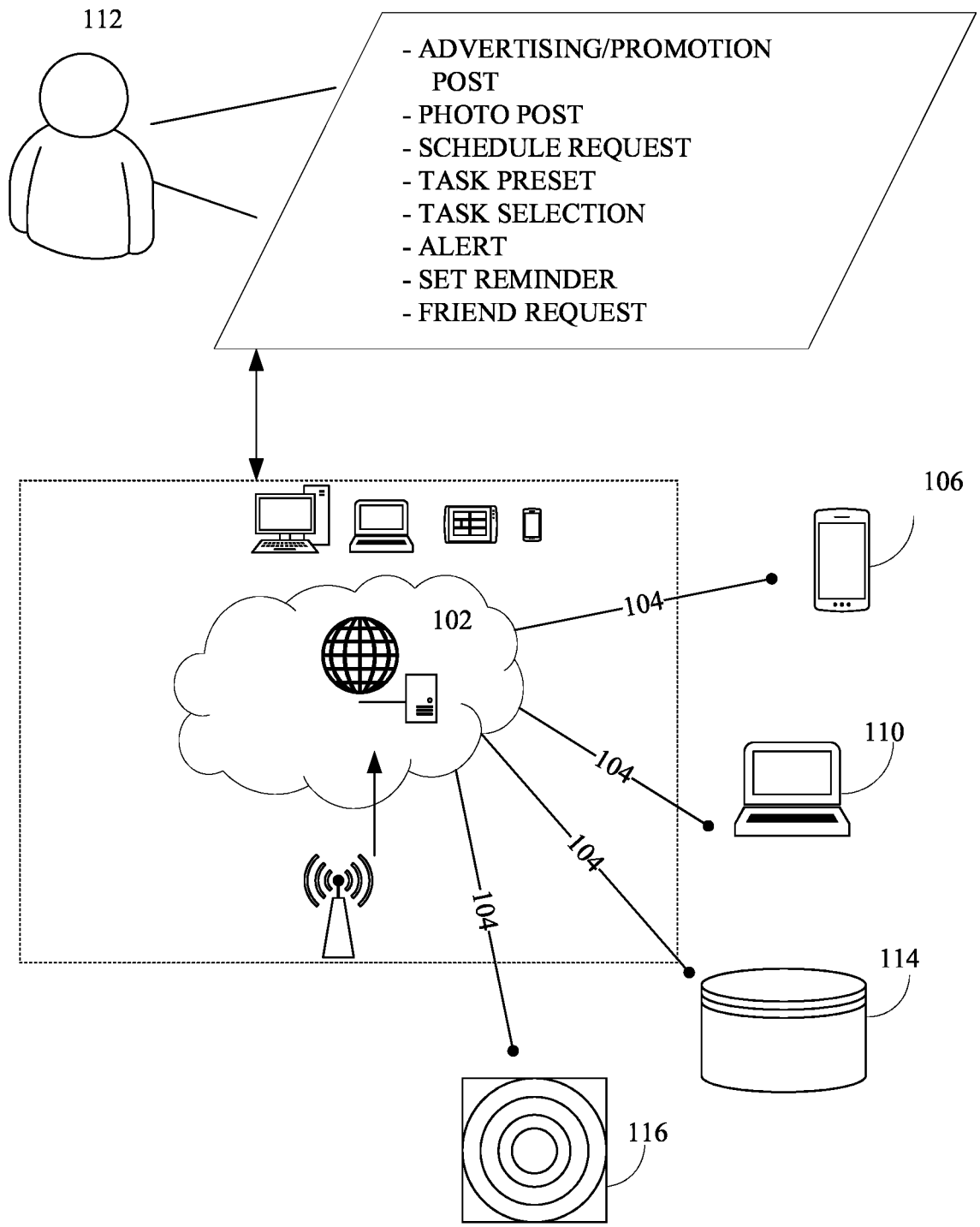
FIG. 1 is an illustration of an online platform consistent with various embodiments of the present disclosure.

Any individual feature may be later modified, condensed into another individual feature. As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and is made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of methods and systems to facilitate the organized scheduling of a plurality of tasks using a software platform, embodiments of the present disclosure are not limited to use only in this context.

Overview:

The present disclosure may describe methods and systems to facilitate the organized scheduling of a plurality of tasks using a software platform. Further, the software platform may pertain to both iOS™ and Android™ users. Further, the present disclosure may assist a user in organizing time, interchanging schedules, separating groups of people, following different types of businesses, and connecting with different groups of people on a software platform (social media web application). Further, the software platform may measure time availability and unavailability associated with the user.

Further, the present disclosure may facilitate and generate the pairing of interests associated with the users to matched counterparts such as retailers, restaurants, venues, professional service providers, physicians, educators/instructors, peers, coworkers, family and friend users. Further, the counterparts may be grouped into specific groupings through a categorized system to avoid leaking of confidential information and to maintain levels of professionalism within levels of interpersonal relationships.

Further, the present disclosure may comprise multiple functionality features for specific performances and different ways for scheduling within different schedule categories and to connect consumers to businesses. Further, the present disclosure may allow businesses and service professionals to organize and publish specified advertisements in which consumers may have access to saving such forms of advertisements along with being reminded of such forms of any saved advertisements portrayed on an itemized calendar specifically for viewing saved advertisements and promotions, which may be referred to as an "Ad Calendar".

FIG. 1 is an illustration of an online platform 100 consistent with various embodiments of the present disclosure. By way of non-limiting example, the online platform 100 to facilitate organized scheduling of a plurality of tasks using a software platform may be hosted on a centralized server 102, such as, for example, a cloud computing service. The centralized server 102 may communicate with other network entities, such as, for example, a mobile device 106 (such as a smartphone, a laptop, a tablet computer etc.), other electronic devices 110 (such as desktop computers, server computers etc.), databases 114, sensors 116 over a communication network 104, such as, but not limited to, the Internet. In one embodiment, users of the online platform 100 may comprise relevant parties such as, but not limited to, end users, retailers, educators, and administrators. Accordingly, in some instances, electronic devices operated by the one or more relevant parties may be in communication with the online platform 100.

A user 112, such as the one or more relevant parties, may access the online platform 100 through a web based software application or browser. The web based software application may be embodied as, for example, but not be limited to, a website, a web application, a desktop application, and a mobile application compatible with a computing device.

Figure 2:
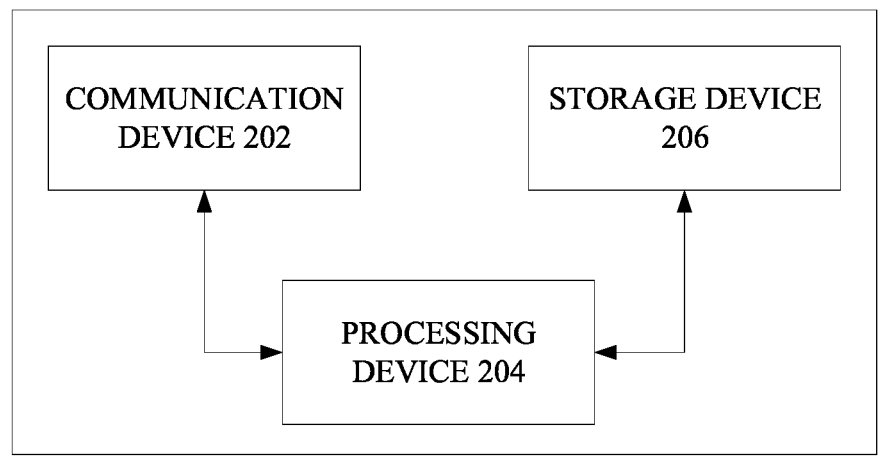
FIG. 2 is a block diagram of a system to facilitate the organized scheduling of a plurality of tasks using a software platform, in accordance with some embodiments.

FIG. 2 is a block diagram of a system to facilitate organized scheduling of a plurality of tasks using a software platform, in accordance with some embodiments. accordingly, the system may comprise a communication device 202, a processing device 204, and a storage device 206.

In one embodiment, the communication device 202 may be configured for receiving at least one schedule request from at least one first user device. In one embodiment, the at least one first user device may be associated with the at least one first user. In one embodiment, the at least one user may comprise an individual, an institution, and an organization that may want to use the software platform. In one embodiment, the at least one user device may comprise a smartphone, a tablet, a laptop, a personal computer, a smartwatch, and so on. In one embodiment, the processing device 204 may be configured for analyzing the at least one schedule request to identify a schedule type, the schedule type comprising a plurality of categories associated with at least one task to be performed by the at least one first user. In one embodiment, the processing device 204 may be configured for retrieving at least one task preset associated with the plurality of categories of the schedule type. The communication device 202 may be further configured for transmitting the at least one task preset to the at least one first user device and receiving at least one task preset selection associated with the at least one task preset from the at least one first user device. The processing device 204 may be further configured for generating at least one schedule reminder based on the at least one task preset selection. The communication device 202 may be further configured for transmitting, based on the at least one schedule reminder, an alert to the at least one first user device. In one embodiment, the alert may be associated with a notification that may comprise a textual message and an alert sound. In one embodiment, the alert may provide the details associated with the at least one task selection and notify the at least one user to perform the at least one task selection.

In one embodiment, the communication device 202 may be further configured for receiving a friend request from the at least one first user device. The processing device 204 may be further configured for analyzing the friend request to identify at least one second user from a plurality of second users. The communication device 202 may be further configured for transmitting the friend request to at least one second user device associated with the identified at least one second user; receiving a confirmation corresponding to the friend request from the at least one second user device; transmitting the at least one task preset to the at least one second user device; receiving at least one task preset data associated with the at least one task preset from the at least one second user device; and transmitting the at least one task preset data to the at least one first user device and the at least one second user device.

In one embodiment, the communication device 202 may be further configured for transmitting map data to at least one first user device associated with at least one first user. The map data comprises marker data indicating at least one business location associated with at least one business. The marker data comprises at least one advertisement associated with the at least one business. The processing device 204 may be further configured for providing one or more options associated with the at least one advertisement. The communication device 202 may be further configured for receiving a selection of the one or more options from the at least one first user device. The processing device 204 may be further configured for performing, in response to the selection of the one or more options, an operation associated with a selected option. The communication device 202 may be further configured for transmitting operation data generated by the operation to the at least one user device.

In one embodiment, the communication device 202 may be further configured for receiving location data of the at least one first user device associated with the at least one first user. The processing device 204 may be further configured for analyzing the location data based on the receiving; determining, based on analyzing the location data, a billboard identifier associated with at least one billboard; retrieving billboard ad data based on determining the billboard identifier, the billboard ad data comprising at least one advertisement associated with at least one business. The communication device 202 may be further configured for transmitting the billboard ad data to the at least one first user device. The processing device 204 may be further configured for providing one or more options associated with the billboard ad data. The communication device 202 may be further configured for receiving a selection of the one or more options from the at least one first user device. The processing device 204 may be further configured for performing, in response to the selection of the one or more options, an operation associated with a selected option. The communication device 202 may be further configured for transmitting operation data generated by the operation to the at least one first user device.

In one embodiment, the communication device 202 may be further configured for: receiving a location from the at least one first user device; transmitting map data to the at least one first user device associated with at least one first user based on the location; receiving a selection of the at least one business from the at least one first user device. The processing device 204 may be further configured for retrieving an advertising form corresponding to the selected business based on the selection. The advertising form may be associated with a selected business for acquiring information from the at least one first user. The communication device 202 may be further configured for transmitting the advertising form to the at least one first user device and receiving a completed advertising form from the at least one first user device. The processing device 204 may be further configured for processing at least one data information entry from the completed advertising form for generating a QR code. The communication device 202 may be further configured for transmitting the QR code to the at least one first user device and receiving a QR response associated with the QR code from the at least one user device. The processing device 204 may be further configured for generating a QR alert based on the QR response. The communication device 202 may be further configured for transmitting the QR alert to the at least one first user device.

In one embodiment, the communication device 202 may be further configured for receiving a gift purchase request from the at least one first user device; transmitting the gift purchase request to at least one business device associated with the at least one business; and receiving an approval corresponding to the gift purchase request from the at least one business device. The processing device 204 may be further configured for generating a gift QR code based on the approval. The communication device 202 may be further configured for transmitting the gift QR code to at least one second user device associated with at least one second user. The at least one second user may be a gift recipient. The storage device 206 may be configured for storing the gift QR code.

Figure 3:
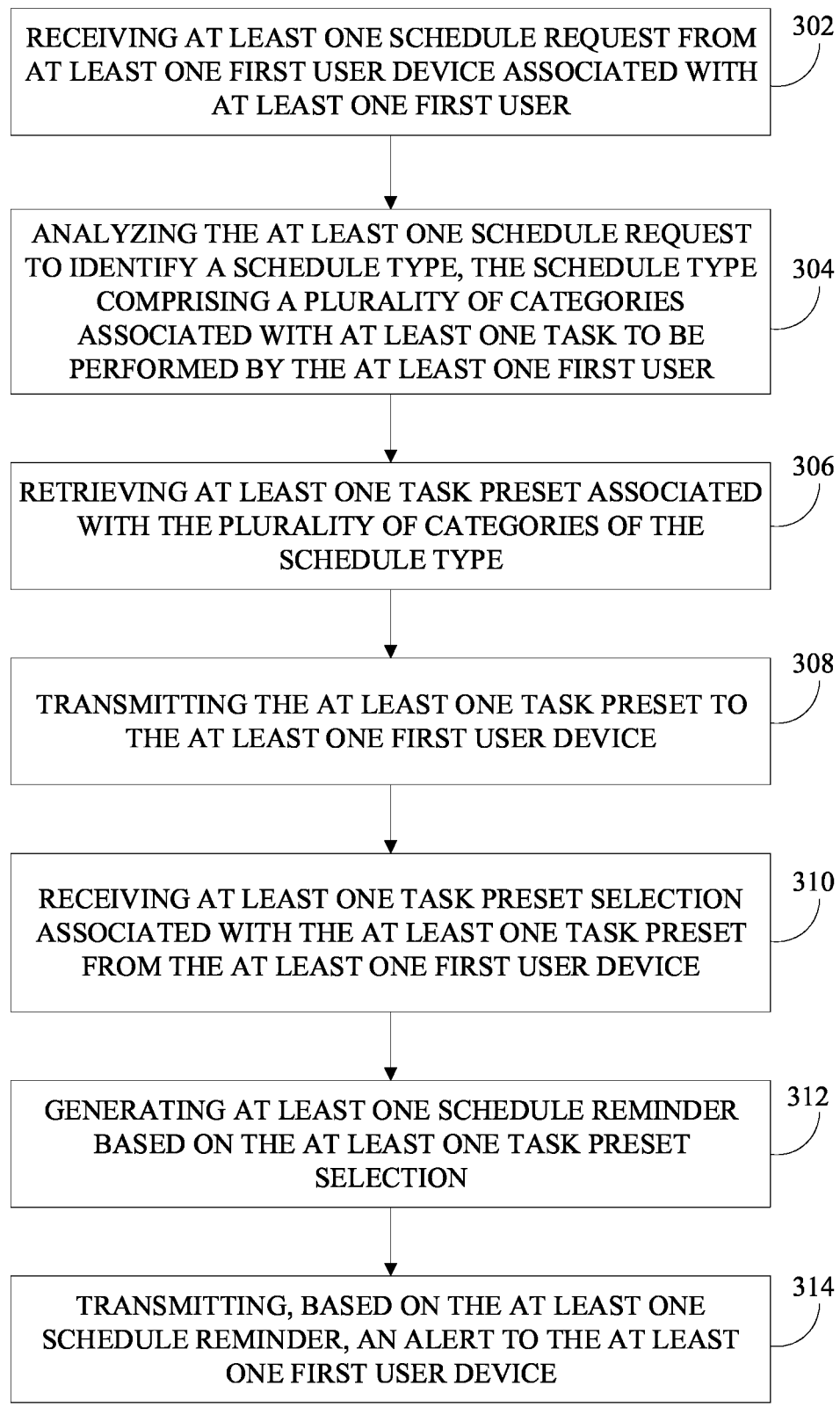
FIG. 3 is a flowchart of a method to facilitate the organized scheduling of a plurality of tasks using a software platform, in accordance with some embodiments.

FIG. 3 is a flowchart of a method to facilitate the organized scheduling of a plurality of tasks using a software platform, in accordance with some embodiments. Accordingly, the method may comprise a step 302 of receiving at least one schedule request from at least one user device. In one embodiment, the at least one user device may be associated with the at least one user. In one embodiment, the at least one user may comprise an individual, an institution, and an organization that may want to use the software platform. In one embodiment, the at least one user device may comprise a smartphone, a tablet, a laptop, a personal computer, a smartwatch, and so on. In one embodiment, the scheduling request may be associated with the at least one task preset. In one embodiment, the at least one task preset may comprise a work that may be performed by the at least one user.

In one embodiment, the method may comprise a step 304 of analyzing the at least one schedule request to identify a schedule type. Further, the schedule type may be associated with the schedule request. Further, the schedule type may comprise a category associated with at least one task that may be performed by the at least one user. Further, the category may comprise a Work schedule category, Friends and Family schedule category, Social Group Event schedule category, Personal schedule category, and Education and Exercise schedule category. Further, the Work schedule category may comprise the at least one work corresponding to a work career associated with the at least one user. Further, the career may comprise an occupation that may be carried out by the at least one user for a time period. Further, the Friends and Family schedule category may comprise the at least one work associated with at least second other user associated with friends and family. Further, the at least one second user may comprise an individual, an institution, and an organization that may want to use the software platform. Further, the Social Group Event schedule category may comprise the at least one work associated with a social gathering event. Further, the social gathering event may comprise an occasion that may comprise at least one user and the at least one second user. Further, the Personal schedule category may comprise the at least one work associated with the personal routine of the at least one user. Further, the Education and Exercise schedule category may comprise the schedule of the at least one work that may be associated with an education or exercise category. Further, the education and exercise category may comprise arts, academics, athletics, recreation, etc. that may comprise the at least one user.

In one embodiment, the method may comprise a step 306 of retrieving at least one task preset associated with the plurality of categories of the schedule type. Further, the at least one task preset associated with the Work schedule category may comprise a clean routine rotation (a feature within the Personal scheduling category but added to work when the user adds their profession as a housekeeper or property manager) for a property location by a housekeeper, a route schedule for a courier delivery organization, shift rotation scheduling, appointment bookings, and any task presets provided under a selected occupation (or profession). Further, the at least one task preset associated with the Friends and Family schedule category may comprise a coffee, a breakfast, lunch, dinner, entertainment, nightlife, travel, shopping, outdoor/recreation, or a custom created schedule, a shopping schedule, and so on with the at least one second user (such as a member of the family or a friend). Further, the at least one task preset associated with the Personal schedule category may correspond to a subcategory. Further, the subcategory may comprise categories pertaining to automobile, medical, self-care, and phone calls, home management, pay bills, shopping, recreation, etc. Further, the subcategory may comprise the at least one task preset. Further, the at least one task preset associated with the automobile category may comprise scheduling for auto maintenance, fuel fill-up, car wash, pickup and drop off, and lastly custom add. Further, the at least one task preset associated with the medical category may comprise selecting a type of doctor, lab, medical testing, therapy sessions, to create an appointment on schedule. Further, the at least one task preset associated with the self-care may comprise beauty salon, barber, massage, spa appointment, personal trainer/workout, etc. Further, the at least one task preset associated with the Education and Exercise category may comprise class scheduling, group training scheduling, group practice scheduling, lecture scheduling, etc. Further, the at least one task preset associated with the Education and Exercise category may comprise class or group scheduling for arts, academics, athletics, exercise, recreations, lecture/seminar scheduling, etc. Users may select taking or teaching, may write hidden or public memos may view or compile rosters/attendees. Further, the at least one task preset associated with the Social Group Event schedule category may correspond to the social gathering event. Further, the social gathering event may be comprised for an anniversary, baby, birthday, celebration custom, formal social, graduation, group travel, holiday, wedding, work social, group travel, etc. Further, a hosting user may manage the list of attendees and prior to scheduling a date and time may use a probability matchup by selecting their invitees Further, the at least one task preset associated with the social gathering event may assist the at least one user to invite the at least one second user.

In one embodiment, the method may comprise a step 308 of transmitting the at least one task preset to the at least one user device.

In one embodiment, the method may comprise a step 310 of receiving at least one task preset selection associated with the at least one task preset from the at least one user device. Further, the at least one task preset selection may comprise at least one task preset associated with the plurality of categories of the schedule type that the at least one user may want to schedule and further perform.

In one embodiment, the method may comprise a step 312 of generating at least one schedule reminder based on the at least one task preset selection. Further, the at least one schedule reminder may assist the at least one user to organize and perform the at least one task selection.

In one embodiment, the method may comprise a step 314 of transmitting, based on the at least one schedule reminder, an alert to the at least one user device. Further, the alert may be associated with a notification that may comprise a textual message and an alert sound. Further, the alert may comprise the details associated with the at least one task selection and notify the at least one user to perform the at least one task selection.

Figure 4:
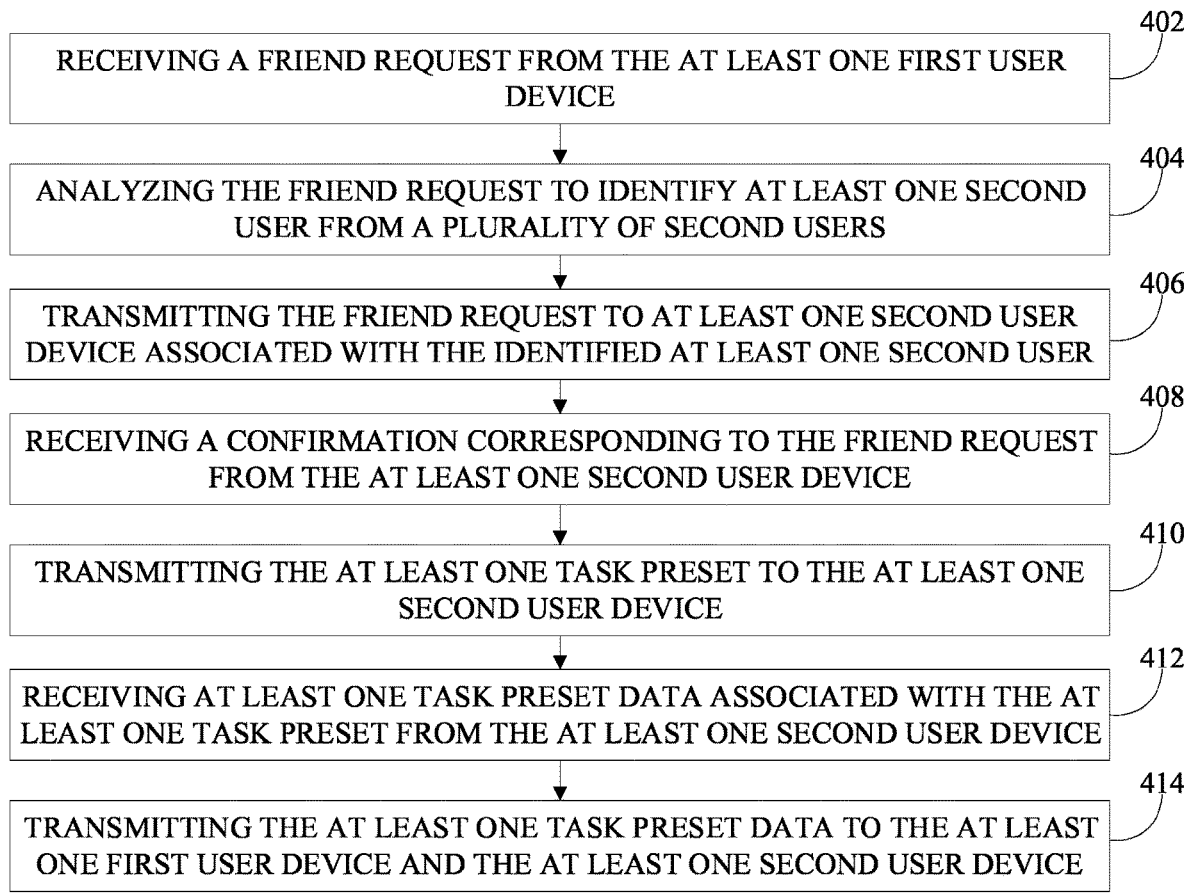
FIG. 4 is a flowchart of a method to facilitate the organized scheduling of a plurality of tasks using a software platform, in accordance with some embodiments.

FIG. 4 is a flowchart of a method to facilitate the organized scheduling of a plurality of tasks using a software platform, in accordance with some embodiments. The method described in FIG. 4, as well as the methods disclosed hereinafter, may be implemented in addition to the method disclosed in FIG. 3. Moreover, the "at least one user" discussed in relation to FIG. 3 may be referred to as "at least one first user", while the "at least one user device" may be referred to as "at least one first user device", hereinafter.

In one embodiment, the method may comprise a step 402 of receiving a friend request from the at least one first user device. Further, the request may facilitate addition of an individual, an institution, and further organization within the friend list (or follower list) of the at least one first user.

In one embodiment, the method may comprise a step 404 of analyzing the friend request to identify at least one second user from a plurality of second users. Further, the at least one second user may comprise an individual, an institution, and an organization that may want to interact with the at least one user.

In one embodiment, the method may comprise a step 406 of transmitting the friend request to at least one second user device associated with the identified at least one second user. Further, the at least one second user device may comprise a smartphone, a tablet, a laptop, a personal computer, and so on.

In one embodiment, the method may comprise a step 408 of receiving a confirmation corresponding to the friend request from the at least one second user device. Further, the confirmation may be associated with a rejection and an acceptance of the friend request.

In one embodiment, the method may comprise a step 410 of transmitting the at least one task preset to the at least one second user device.

In one embodiment, the method may comprise a step 412 of receiving at least one task preset data associated with the at least one task preset from the at least one second user device.

In one embodiment, the at least one task preset data may comprise at least one graphical content, advertising content, etc. In one embodiment, the at least one graphical content may comprise an image, an audio-video, an audio, a video, etc. In one embodiment, the advertising (or promotion) content may be associated with businesses such as venues, retailers, restaurants, and service professionals on a Daily Scroll with a location radius. In one embodiment, the advertising content may facilitate promotion of the businesses.

In one embodiment, the method may comprise a step 414 of transmitting the at least one task preset data to the at least one first user device and the at least one second user device. In one embodiment, the transmission of the at least one task preset data may be based on at least one criterion. In one embodiment, the at least one criterion may comprise the schedule type, a location radius, etc. In one embodiment, the at least one task preset data may be displayed on a News Feed Screen that may be associated with at least one of the at least one user and the at least one second user.

Figure 5:
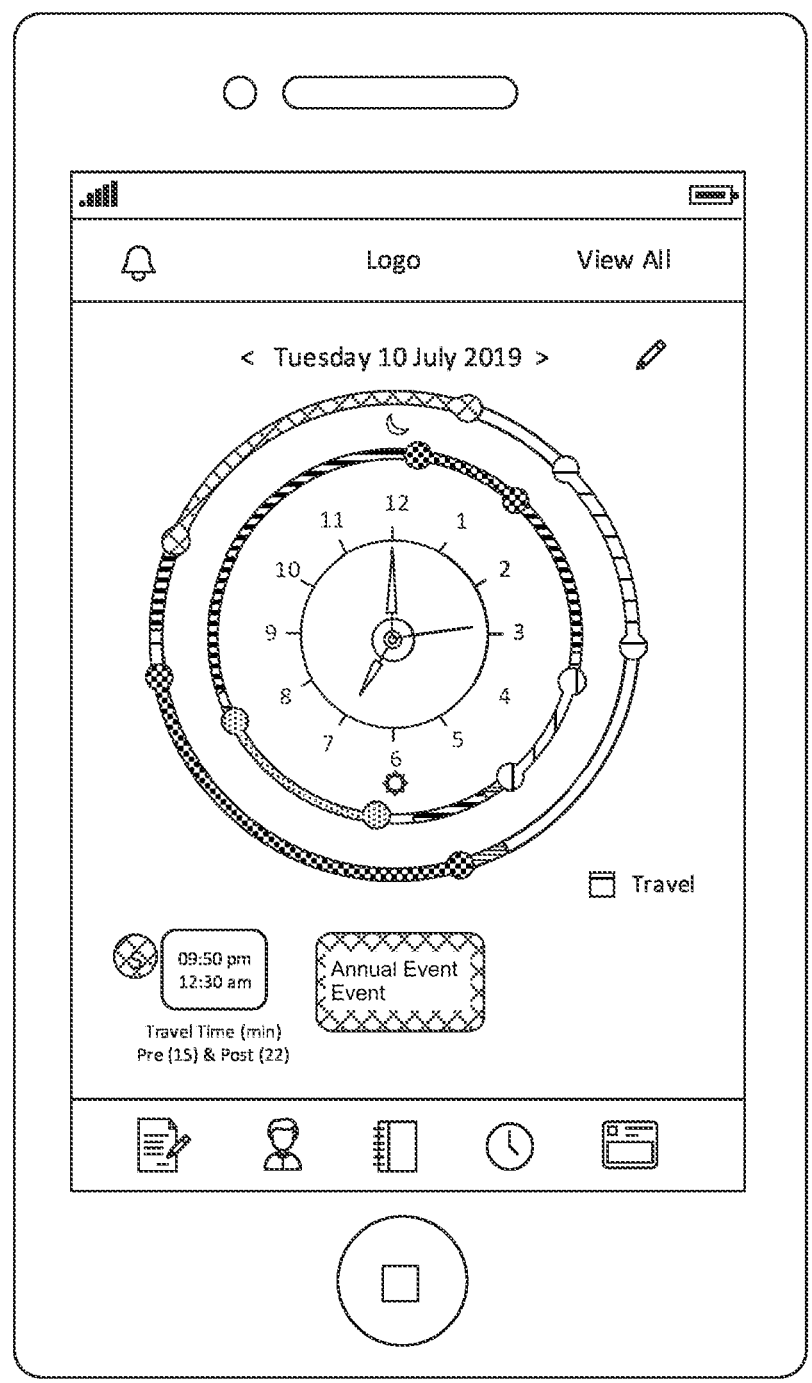
FIG. 5 is an exemplary illustration of a Clock user interface associated with the software platform, in accordance with some embodiments.

FIG. 5 is an exemplary illustration of a Clock user interface associated with the software platform, in accordance with some embodiments. Accordingly, the Clock user interface may facilitate the displaying of an analog clock that may comprise a 24-hour view on a numeric system of 1-12. In one embodiment, the Clock user interface may comprise two circulating rings around the analog clock that may signify AM timings and PM timings. In one embodiment, the Clock user interface may comprise two additional transparent rings that may appear, upon placing of a schedule for an Overlay Schedule to signify the allotted time period. In one embodiment, the at least one user may select an allotted schedule or any Overlay Schedule (or the schedule) on the rings of 24-Hour Clock (analog clock) to view the details associated with the selected schedule below the clock from the Time Scroll.

Figure 6:
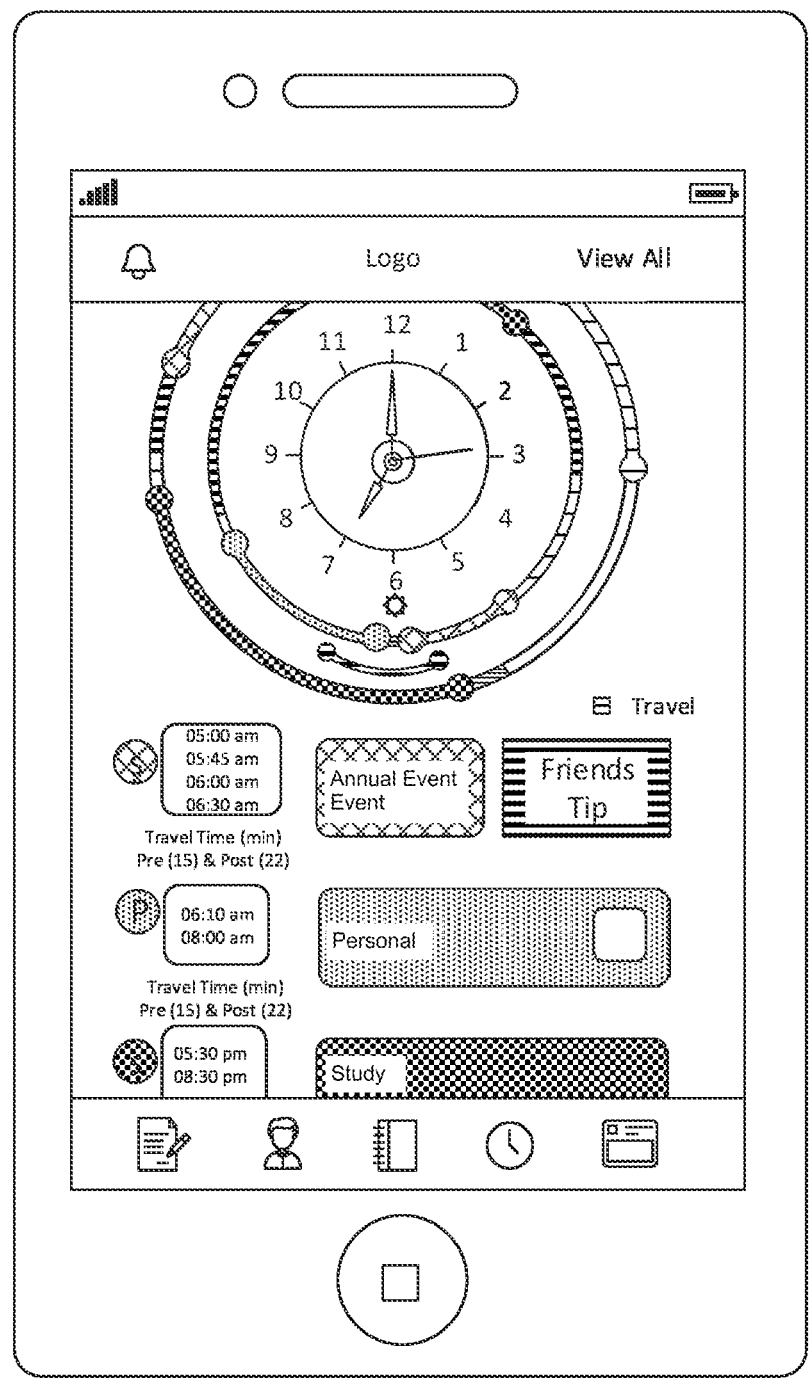
FIG. 6 is an exemplary illustration of a Time Scroll user interface associated with the software platform, in accordance with some embodiments.

FIG. 6 is an exemplary illustration of a Time Scroll user interface associated with the software platform, in accordance with some embodiments. Accordingly, the Time Scroll user interface may facilitate the display of scheduled allotted times. In one embodiment, the Time Scroll may display the scheduled allotted times that may be displayed below the analog clock in the Clock user interface. In one embodiment, the Time Scroll user interface may display the schedule type, a color corresponding to the schedule type, a schedule topic (or task), a time, a date, a location and any additional listed information may be displayed. In one embodiment, the at least one user may view the time schedules in chronological order, upon scrolling up and down. In one embodiment, the at least one user may view the time itineraries, any note(s), hidden note(s), or other details associated with the schedule by selecting the schedule from the Time Scroll to portray the Single Scheduled Item View screen. In one embodiment, the 24-hour Clock viewing with its Time Scroll may be generated from a specific calendar date selection.

In further embodiments, the software platform may facilitate organized scheduling, shortcuts to scheduling, types of schedules that have task presets but can also be custom tailored, and a special alert system that utilizes upkeep through question-and-answer interaction with the user. In one embodiment, questions are pre-designed through preset assignments and based on responses within the sign-up questionnaire upon creating a user profile. Schedules can be shared, and transparently shared as Overlays along with the sharing of lists and memo information. The software platform may comprise a highlighted feature consisting of a 24-Hour Clock view of posted schedules with the option of adding vicarious viewing of Overlay transparent schedules. There may be up to five main screens and within each screen are special functionality features. The five main screens may comprise a Planner screen, a List screen, a 24-Hour Clock screen, a Profile screen, and a News Feed screen.

In one embodiment, the Planner screen is attached to two forms of adding and two forms of viewing. One is the Date Scroll View and the other is the Calendar View in which both views can be viewed separately or conjoined upon the same screen. The purpose of the Planner screen is to create more thorough scheduling at the time of adding rather than using the List Screen Quick Add feature which has the Add Now Schedule Later Feature.

In one embodiment, the Date Scroll View may be associated with the schedule that may not be timed. Anything scheduled on the date without a time will be the first to appear under the date to signify an all-day event schedule or a non-timed schedule/goal. Its color will indicate its corresponding category, however, if no category was ever selected, it will appear as the color indicating a holiday/occasion. These non-specific timed schedules can still be selected from the Date Scroll where they will solely appear for the options to edit, delete, share within the Single Scheduled Item View Screen. Any schedules that do have times will appear in chronological order underneath their given date and may also be solely selected for editing, deleting, and sharing.

In one embodiment, the Calendar View Screen may provide the user with the ability to see an enlarged calendar. In one embodiment, the enlarged calendar may be shown by showing all schedules or itemizing the viewing of the schedules by selecting the schedule category.

In one embodiment, the Add to Agenda feature is to add a schedule or non timed task/event. The options of schedule type categories appear with their corresponding color representations. There are five schedule types consisting of W for Work, F for Friends and Family, S for Social Group Event, P for Personal, and E for Education and Exercise.

In one embodiment, the task may be selected (or inputted) after selecting the schedule category. In one embodiment, upon selecting the Work Schedule category, the following work task presets will appear based on tasks created for a line of popular and common careers. Any career that does not provide a preset of tasks, can be custom created within the questionnaire where then the user also custom adds typical tasks that they perform for their career. They may also add custom tasks to a list of common work tasks of careers. The option to create a task or schedule as an Overlay will have the tag option to select whom the work task or schedule is being created for. The preset of task selection will appear based on the user's job selection within the questionnaire during the creating of an account process. If businesses and self-employed users created a business page, then the business booking features such as reservations, appointments, ticket sales along with employee schedule management such as shift rotations, notes, and any other business scheduling can be managed through a shortcut within the Work Schedule category selection by being the administrator of the business page. Special task scheduling features include housekeepers who work for companies whom are able to schedule and adjust to their clean routine rotations per property location, and also drivers, pilots, and couriers who work for a company will be able to adjust their route schedules. Also, the option to add a custom task will be available.

In one embodiment, upon selecting the Friends and Family Schedule category, the option to add the person performing or joining the task activity may appear and then afterward the preset tasks may appear. The option to add the schedule as an Overlay is also available. The task options are coffee, breakfast, lunch, dinner, entertainment, nightlife, travel, shopping, outdoors, and the custom add for a new task. If a friend is not a user and is added, the person creating the schedule can add the person as a page by adding the actual user email or phone number.

In one embodiment, upon selecting the Personal Schedule category, task presets will appear within categories. The automobile category will show auto maintenance, fuel fill-up, car wash, pickup and drop off, and custom add as task options. The medical category will show options to make an appointment with doctors, labs, and organize medication routines. Doctors and their specialty will appear from the questionnaire and saved within the List Screen for editing. The self-care category will have the option to select and create beauty, salon, barber, massage and spa appointments to be placed on schedule. The call category is a task reminder strictly for having to make phone calls, when selected a fill-in box will appear to input a name out of contacts or manual entry to make a phone conference schedule with and the subject of the call. The home category will have house chores appear involving the clean routine rotation, indoor home maintenance and outdoor home maintenance preset tasks and the ability to custom add a specific home chore.

In one embodiment, the Education and Exercise Schedule category may hold the purpose of scheduling any group classes or group practice and training. If education is selected the option to select academics or arts will appear. In one embodiment, the academics may provide the option to add a class subject and course number. In one embodiment, the arts may provide the option of quicker selection by providing art subjects as presets or the option to create a new art subject. Then the option for taking or teaching the class will appear for selection. For teaching, a roster box will appear to give users the option to add their rosters to the course. Date, time, location, and a hidden memo or public memo may be added. When selecting exercise, class may appear with the option to tag title the name of the exercise class, and practice may appear with a sports list option to choose from or the ability to custom add if not mentioned. The option for taking or teaching will appear, for teaching, there will be a roster option to add the schedule. Date and time selection along with location and hidden or public memo box will also appear.

In one embodiment, upon selecting the Social Group Event Schedule category, the option to select hosting may appear. If names cannot be tagged, then they can be added. In one embodiment, an option to select the purpose of the event may appear, such as anniversary, baby, birthday, celebration (with title tag box), custom add (also with title tag box), formal social, graduation, group travel, wedding, and work social. In one embodiment, the probability matchup is a feature within Social Group Event Scheduling category that allows users who are creating an event to select all their invitees and a potential day(s) or date(s) with a time and see the likelihood of how many people would most likely be able to attend based on the date selections. Date and time selection may be selected straight from the probability matchup results. If the probability matchup is not used, then date and time selection may appear. Invitee will also appear for the user to add and send all their invitees. Attendees will appear for people who were invited outside of the application software and who already RSVP'd but will also update when invitees from the application software RSVP. The user may mark off "formal invitation to follow" with the option to also request addresses when marking off formal invitation to follow. When a formal invitation is selected, the application software may remind the creator of the event to send out formal invitations. The software application may ask the invitee to confirm, retrieve and tact their address to the event creator's address book. The creator of an event may have a hidden memo box on their event for any notes and thank you notes when receiving gifts given upon the event. The application software may ask and or remind the user to send out thank you cards in the mail. The application software may also ask the invitee if they plan to give a gift while assuring the invitee that the application software will not notify the creator of the event until a reveal time is set sometime after the event is over. This transaction creates additional information to be added to the thank you notes list for the creator of the event or insures the validity of the gift provided by the correct giver of any such gifts.

In one embodiment, to create any schedule as an overlay, which is a soft schedule for a creator and a solid schedule for the person being tagged, the tagged person accepts it as a solid schedule otherwise it may remain as an overlay also for the tagged person. The overlay selection option will be provided at the end of each schedule category. When the schedule is selected as an overlay, the user has the option to tag any person(s) the schedule is created for or to be shared with. For Social Group Events, there is already an option to tag the name/insert the name of the person the event is being hosted for, however, the additional name tagging may also apply if the Social Group Event Schedule was created as an overlay for the creator and a solid schedule for the tagged user. When an overlay is created, and if the tagged person is a user on the application software, they will be notified that a solid schedule was created for them which they can confirm its status to be added as an overlay or solid schedule. When any type of schedule or event is sent to another user, and the user receives that schedule as an overlay, then it will appear on the transparent rings of the 24-Hour Clock as an overlay schedule. When users respond with "maybe attending" to any invites, then automatically the schedule invite may appear as an overlay until the invitee clarifies their R.S.V.P. and the schedule will then appear as a solid schedule if the user plans to be an attendee.

In one embodiment, the schedule with friends feature is a condensed shortcut version of the Friends and Family Scheduling category method within the Add to Agenda feature. In one embodiment, upon clicking the schedule with friends, the screen may appear with a search bar to search for friends to select. In one embodiment, the user's favorites may also appear under the search bar. In one embodiment, the calendar and a matchup icon may be next to the profile photo and name associated with the user's favorites'. When the calendar is selected the user may select multiple dates upon the calendar, after being able to view how busy each day on the calendar appears, then select a time, select an activity and location, and then send to the user's friend who will retrieve the information then may compare the dates and times to their own scheduling, thus select one of the dates and times, and if selected, then both user's will have the scheduled outing simultaneously added to their schedules. The calendar scheduling may comprise booking a schedule with a friend based on how busy the user is, so based on date and time availability and not necessarily by the type of activity. The matchup icon is a quicker version of scheduling with Friends and Family Favorites and is mainly based on activity preset time windows. When selecting the matchup icon, some of the activities from the activity list within the Friends and Family Schedule category will appear, and if coffee, breakfast, lunch, and dinner are selected, then the times will be preset based on the user's questionnaire on when they typically have their time window for coffee, breakfast, lunch, and dinner. Once the activity is selected, the estimated duration of the activity may need to be selected. Once duration is selected, the user will see upcoming available dates and times in chronological order on when the person they are inviting can potentially meet with them. The user may select all or one, then invite the other user. If and when the other user selects a date and time, pair mutual location may be an option to find a location setting of mutual meeting distance that is relevant to the activity selected for scheduling once all selections are met, then the schedule will simultaneously be added to both users.

In one embodiment, the List Screen may demonstrate the ability to quickly add tasks and to view pending tasks. The list screen also holds the purpose of holding informational lists and memos. The functionality of the list screen overall is used to quickly add tasks and adding schedules to the tasks/activities later. In one embodiment, the Quick List may comprise function features such as Quick Add, Pending Task, File Folder, Schedule Later, Extending, Sharing, Added from the Planner, Clean Routine, Medication Routine, and Correspondence with the Alert feature, etc. In one embodiment, the Quick Add feature may assist the users in quickly adding a task within a three-step or four-step or five-step method. In one embodiment, the user may type the task on the List Screen page, then select the category of the task. If the category of the task is not selected, the user has the option to add the task without selecting a schedule category by hitting the add button again and skipping the category selection options. Quick Added tasks are to be quickly added without having to simultaneously select a date and time. This is the quickest three-step method. If the user does not select a schedule category by using the quickest three-step method, and therefore saves a task unassigned to a schedule category, the user then is able to view the unassigned tasks later in the pending list folder in which the software will remind the user to assign a schedule category and/or assign a schedule pertaining to a date and/or time, repetitiously until the user can do so for further organization. If the user does not want to select a category or/nor a schedule, then the user also has the option to select no category and/or no deadline, which may remain in the pending list folder under these specifications with the date first created. The next step method is the four-step method. The four-step method may consist of typing the task, selecting the add button after task is typed, selecting the category of the task, and if there are no more than one folder within the category or user does not want to select a file folder within the category, then the four-step method is completed when the user skips file folder selection by clicking the proceeding add button indicating "add now, file later" or any other similar wording indication. If there are more than one file folder within a category, and the user chose to not assign a file folder, then the task may save within the category of its general folder or go to the pending task list folder to remind the user to assign a file folder to the task category if the user chose to file later. The five-step method pertains to the user having more than one file folder within a category. The steps may comprise typing the task, then select the add button, selecting the category, selecting the folder which will appear if there are more than one folders, then selecting the folder for the final step for quick add completion.

In one embodiment, the Pending Task feature may hold three main purposes. One purpose is the pending task folder to collect any copied future schedules on new user's iPhone™ and Android™ and Google™ calendars. These previously made tasks outside of the application software that are copied from a synchronization method may appear in the pending task list for the users to assign categories to the schedules and edit the schedules. Another purpose of the pending task feature is for following one of the step methods from the quick add feature where tasks would need to appear in the pending task folder for extensive organization. A third purpose for the pending task feature consists of non-categorized and/or nonscheduled tasks to mainly have a no deadline selection, and then, therefore, remain in more of a goal itemized section of the pending task feature where the software reminds and asks the user of their progress periodically of the task that does not have a designated deadline. If the no deadline task is not selected, and the user continues to exit the notification within the pending task folder, the task will remain pending and continue to remind the user to add the task to the calendar with a date and/or a time to have a schedule.

In one embodiment, the File Folder feature generalizes a folder for each category. Within each category, users can add more file folders.

In one embodiment, the Task Review feature may refer to the viewing or editing of an added task. The task will be displayed in its corresponding category folder, or pending folder, where the task can be selected for editing, for adding a time and date, for marking as completed, and for sharing and sending.

In one embodiment, the Schedule Later feature may be associated with the List Screen. Further upon typing date or time within the typing of task, the software platform (mobile application) may be able to recognize the typing of time placement and date placement and predict the accuracy of the typing. In one embodiment, the software platform may display the data on the calendar. In one embodiment, the user may modify the date if the date is incorrect. In one embodiment, the user may modify the time by manual correction, if the time is also incorrect. If the user did not list any wording indicating a date or a time within the typed task, a reminder will occur as an extensive feature alert so the user may place a date and time to the pending task or set the pending task as a no deadline task or goal task and no longer appear as an extensive reminder. Voice to text may be implemented within the Schedule Later feature along with pending task/extensive reminders for reviewing the retrieved voice to text information accuracy prior to becoming solid schedules.

In one embodiment, the Extensive feature is the redirection of a quickly added task that may be later set to a schedule. The feature may apply what was already inputted and shown for review and for editing such as adding more details such as time, date, location, schedule categories, or memos.

In one embodiment, the Sharing feature may allow users to share a task on schedule or pending task that needs extensive information such as being placed on a schedule. A task can be selected individually or by multiples within a specific file folder. Tasks can also be received from other users, where they may appear in a pending task folder, where the recipient user can keep the task's former category or edit it.

In one embodiment, the Added From The Planner feature may add any tasks or schedules or occasions that were added from using the Planner Screen, through assigning schedule category types to its corresponding list type within the List Screen files.

In one embodiment, the clean routine, transportation routine, and medication routine features may appear in the List Screen but are originally created within the Planner Screen. In one embodiment, the documented information for date rotation and time rotation will appear within the personal file or work file of the List Screen. To make any routine changes from the List Screen then user may be redirected to the Planner Screen.

In one embodiment, the Correspondence With The Alert Page feature may comprise any quickly added information that has not undergone the extensive feature process which will need to connect the allotted information to the schedule category type within the Planner Screen that may appear from the Alert Page to remind users to set the task or information to the calendar. Users can change when to be alerted (i.e., every night at 9 pm or every morning at 8 am). If alerts are not viewed, then another reminder may appear. In one embodiment, the information may be continued to be alerted each day until it is either set to a schedule or marked as an all-day event, or no deadline task by the user.

In one embodiment, the single item scheduled screen is a screen that may display a created single schedule in a more in-depth format that is visually enticing to the users including self-schedules, overlays, and social invites. There will be tools for editing, sharing and deleting. If the user is viewing a single item schedule that is an overlay that was created by someone else for the user, the user may click on the editing tool to make changes to the overlay schedule that was created for them, but the original creator of the overlay will be notified and have to approve the edit and also have the option to save the change simultaneously if approved. If there is an overlay viewed in the single item schedule screen that was created by the user, then editing the overlay schedule will operate the same way as editing other types of schedules which would be to redirect the user to the Add to Agenda Screen.

In one embodiment, the overlay scheduling feature may allow the user to create the schedules for one another and share them. In one embodiment, if the user may not be able to complete the task schedule, the overlay scheduling feature may allow the users to send their schedule to someone to complete it for them (share for other users to complete) which would then turn their solid schedule into an overlay schedule. In one embodiment, the overlay scheduling feature also operates for Social Group Event Schedule types to appear as an overlay for family members who are attending social events, but also for users who replied with "maybe attending" to appear as an overlay on their schedule. Users may add an overlay by tagging another user or person to the schedule when creating the schedule within the scheduling screen. All overlay schedules appear on the two exterior transparent rings or other differential illustrations apart from solid schedule illustrations within the 24-Hour Clock and side by side or offset within the Time Scroll.

In one embodiment, the Syncing may comprise two forms of syncing. In one embodiment, the first method of syncing may comprise sending a schedule to a user and the user may retrieve it as a synced solid schedule or as an overlay. Then there may be the option to change an overlay schedule into a synced solid schedule when editing the schedule later. Synced Schedules saved as Solid Schedules appear on the fully visible rings on the 24-hour Clock view as part of the user's 24-hour schedule which will account as unavailable for any probability matchups.

In one embodiment, the Alert Screen may hold the format of channeling the artificial intelligence within the virtual secretary of the application to communicate with the user. The artificial intelligence acts as a question-and-answer feature and then redirects new placement within the mobile application. In one embodiment, the questions that the virtual secretary has may appear as an alert within the application and within the alert screen. If the questions go unanswered, the questions may re-alert the user until the questions are completed. Most of the settings of preset reminders of the artificial intelligence and its jargon will be configured within the questionnaire. Such preset reminders include bedtimes, medication alerts, when to leave to arrive on time to a certain location, when to review pending schedules, pending RSVPs, alerts, etc. The artificial intelligence may ask the user if they are running on time, if running late is answered by the user, the artificial intelligence may notify the other users involved that someone is running late. The artificial intelligence may follow up on 'maybe attending' invites for users to RSVP timely and other overlays whether they should become synced solid schedules. The alert system will also alert the user of any cancellations, postponements or changes of a schedule. If a picture is taken through the application, the artificial intelligence may attach the photo to the schedule category and date and time and location listed within the schedule to be reviewed for which parts of information are chosen as confidential prior to the user posting any photo into the people News Feed Screen. Within the questionnaire when creating an account, the user must answer when their spare time usually is, such as long lunch breaks, or evenings, or times during the weekend. Users' spare time selections may allow the artificial intelligence to alert the user to go over any quick adds within the List Screen, alert the user of any "what's happening now", of any "flash sales", of any expiring saved deals, where the user may be redirected to the News Feed Screen. In one embodiment, based on the current location, the user may be able to filter by activity by that given current real time or a future selected date and time. In one embodiment, based on the closest current location, the user may be able to see advertisements used by businesses to attract consumers/customers to arrive during a specific time of the day. In one embodiment, businesses may be alerted based on the confirmation by the user reserving a spot for appearance.

In one embodiment, the News Feed Screen may serve the purpose of following other user's updates and connect the users to businesses such as retailers, restaurants, entertainment venues, and service professionals. The News Feed Screen may show a division feed selection one for people and one for places. In one embodiment, the people feed may show posted photos of users followed on a 7-day feed or custom cutoff feed view selected by the user. After 7 days or the selected cut off day limit, the user has the option to move their photo to their Calbum (calendar album) or view photos presented in the feed by selecting any specific date on the calendar to view photos posted on that particular day from both the user and the user's friends that they are following. The Calbum may also reside on a user's profile page and is a date documented album. When capturing a picture within the application, the user may select the candid option. The candid option does a random countdown and snaps the photo(s) within the countdown so users may not be fully aware of when exactly the photo is being taken. Candid Photos can also be posted to the People News Feed Screen and not just on the user's profile. In one embodiment, the Places News Feed Screen may show advertisements for businesses such as venues, retailers, restaurants, and service professionals on a daily scroll within a location radius of the user's current location or selected location. In one embodiment, the user may look ahead at advertisements by selecting the calendar icon within the Places News Feed Screen to see any upcoming deals and promotions. In one embodiment, the user may also book a day to visit a location within the Places News Feed Screen, and also invite other users to join them which would shortcut to the matchup feature methods within the Friends and Family Schedule category and also shortcut to the matchup probability feature within Social Group Events Schedule Category.

In one embodiment, the business advertising feature may comprise advertising/promoting within the Places News Feed Screen. In one embodiment, the businesses may schedule an advertisement, the daily length of the advertisement, and the location radius to be posted within the Places News Feed. The daily news feed may be organized in chronological order. Consumer users of the application may peruse deals and promotions through a daily/timely scroll and also through clicking the calendar option within the news feed to go to a specific date, selecting a specific category and selecting a location and also may be viewed on the map after selecting a specific location (MapAds). When consumers book a day and/or time to visit a business from the Places New Feed Screen or from the Business Profile Page, then the business may be notified of consumer traffic reports. In one embodiment, individuals that may represent providing a service for a business or entertainers representing a venue, may be promoted within the Places News Feed. In one embodiment, the users may book upon seeing a person promotion which would not appear as a consumer traffic report but more so as an appointment or possibly a digital admission ticket. In one embodiment, the businesses may also have intermediary pages connecting the managers/owners to employees where shift changes and work schedules may be shared and posted. In one embodiment, the businesses, depending on the type of business, may have different formats of scheduling for consumers to reserve time or make appointments.

In one embodiment, an individual user Profile Page may display a profile photo, a calendar icon, a clock icon, and a share icon. In one embodiment, the user may schedule or invite someone directly from another user's profile page. When visiting someone's profile page, the visitor may view the other user's 24-Hour Clock View and also swipe side to side to view the user's 24-Hour Clock View on a 7-day swipe or whichever is allowed per user custom settings. The visitor may select an open space on a ring of the 24-Hour Clock and invite the other user to join them for an activity or event. The calendar icon on the profile page may be selected to schedule an activity by selecting a date and seeing the other user's availability on that given date, or also send invites to any previously scheduled social events to the user's profile. The share icon may be selected to share single solid schedules, overlays and lists from the List Screen which may be synced by the receiver as a solid schedule or retrieved as an overlay. The profile page may comprise an about section of careers and hobbies along with information for contact information and schedules which the user of the profile being viewed may select visibility to certain followers. If a user doesn't see any contact information such as phone number, email, and/or address listed on another's profile page then they may select a request for contact information to retrieve one or some or all of the above mentioned which any information approved for retrieval will then become part of the requestor's address book within their List Screen in order to help the artificial intelligence to assist in reminders for formal invites, gift-giving, or thank you note send-outs. The Profile Page may comprise a scrolling photo album and a calendar archived of other photos on selected previous dates (Calbum feature).

In one embodiment, the privacy settings may be created within the questionnaire and mostly organized through the itemization of favorites. In one embodiment, the user may itemize their followers as Friends and Family Favorite. The Friends and Family Favorites may be able to retrieve users' addresses and be notified of special occasions such as birthdays, anniversaries, etc. In one embodiment, the Friends and Family Favorites may be able to view the schedule categories such as Work, Education and Exercise, and Social Group Event, and Friends and Family. In one embodiment, the personal favorites may be able to see all special occasions dates, Friends and Family Schedules, Work Schedules, Class Schedules, and Social Group Event Schedules, and Personal Schedules (only if a personal single schedule is marked as "make visible to personal favorites" prior to saving) upon viewing the 24-Hour Clock and Calendar. In one embodiment, work favorites may be able to view contact info, birthday info, and see Work Schedules within the 24-Hour Clock and Calendar view. Education and Exercise favorites may be able to see birthdays and Education and Exercise Schedules within the 24-hour Clock and Calendar view. In one embodiment, the user not marked as a favorite may view all marked unavailability without being able to see the schedule category. In one embodiment, the unavailable time may comprise the same color as a blackout/unavailable corresponding schedule color. When adding followers, the followers may be marked to a specific schedule category. When photos are posted, prior to posting, the software platform (mobile application) may verify with the user on which of the followers may be able to view their photo post and may appear as "not visible to" with selection boxes on which schedule category followers may not view the post.

Figure 7:
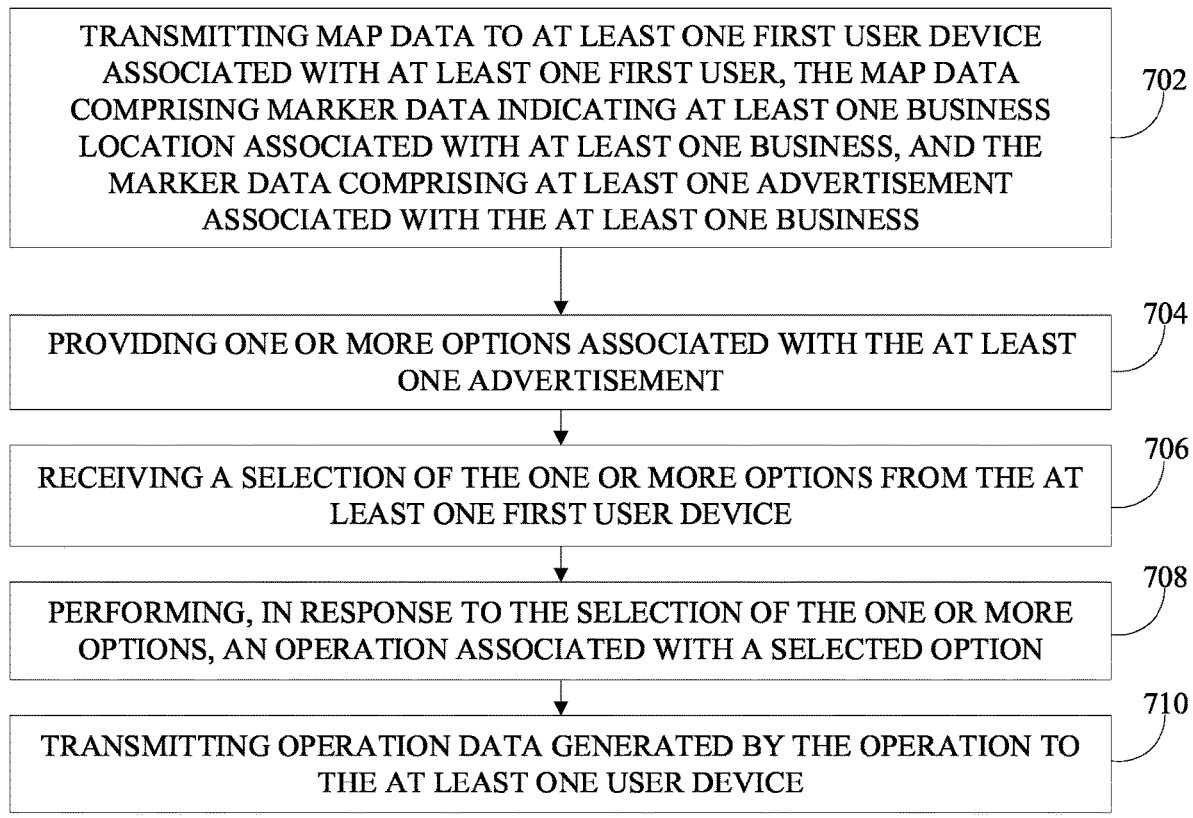
FIG. 7 is a flowchart of a method to facilitate the organized scheduling of a plurality of tasks using a software platform, in accordance with some embodiments.

FIG. 7 is a flowchart of a method to facilitate the organized scheduling of a plurality of tasks using a software platform, in accordance with some embodiments. The method discussed in relation to FIG. 7 can facilitate scheduling based on user interaction with locations. Accordingly, the method may comprise a step 702 of transmitting map data to at least one first user device associated with at least one first user. In one embodiment, the map data may be displayed on an application. In one embodiment, the application may comprise a digital map. In one embodiment, the map data may comprise marker data indicating at least one business location associated with at least one business. In one embodiment, the marker data may comprise at least one advertisement (Map Ads) associated with the at least one business. In one embodiment, the at least one business may comprise restaurants, retailers, venues, service professionals, service providers, etc. In one embodiment, the advertisement may comprise promotional offers of events, products, services, etc. In one embodiment, the Map Ads may comprise information associated with the at least one business. In one embodiment, the information may comprise flash sales advertisements, rotational sales advertisements, promotional advertisements, grand opening/closing/relocating advertisements, announcement advertisements, etc. In one embodiment, the Map Ads may provide the at least one user with options for the at least one business. In one embodiment, the options may comprise a follow/unfollow option, a share option, a schedule option, a reminder option, etc.

In one embodiment, the method may comprise a step 704 of providing one or more options associated with the at least one advertisement. The one or more options may be associated with the at least one business.

In one embodiment, the method may comprise a step 706 of receiving a selection of the one or more options from the at least one first user device. The one or more options may comprise a follow/unfollow option, a share option, a schedule option, a reminder option, etc.

In one embodiment, the method may comprise a step 708 of performing, in response to the selection of the one or more options, an operation associated with a selected option. In one embodiment, the follow/unfollow option of the Map Ads may result in registering or deregistering the at least one user device for sending updates of the at least one business. In one embodiment, the share option of the Map Ads may result in the generating of a shareable identifier. In one embodiment, the shareable identifier may result in a web link, a location coordinate, etc. corresponding to the at least one business. In one embodiment, the at least one user may share the Map Ads using the shareable identifier to another user. In one embodiment, the schedule option of the Map Ads may result in the generation of schedule details. In one embodiment, the schedule details may comprise date, time and location details of an advertising announcement associated with the at least one business. In one embodiment, the reminder option of the Map Ads may result in the generation of reminders. In one embodiment, the reminders may comprise alerts, updates, notifications, etc. associated with certain offers, coupons, sales, etc. from the at least one business.

In one embodiment, the method may comprise a step 710 of transmitting operation data generated by the operation to the at least one user device. For instance, the operation data may comprise the shareable identifiers, the schedule details, the reminders, etc. depending on the specific operation being performed. In one embodiment, the shareable identifier may be transmitted for the share option. In one embodiment, the schedule details may be transmitted for the schedule option. In one embodiment, the reminders may be transmitted for the reminder option.

Figure 8:
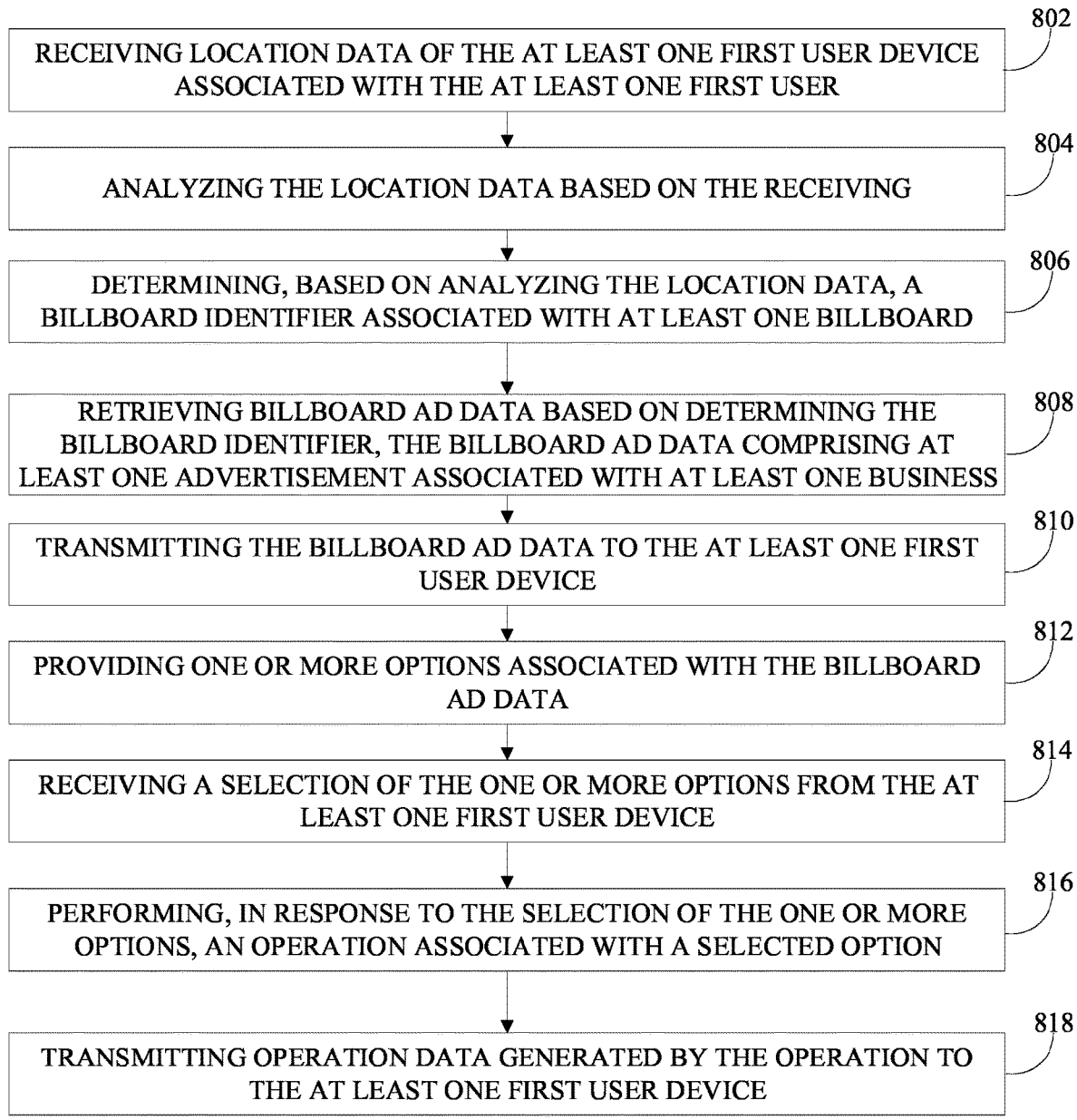
FIG. 8 is a flowchart of a method to facilitate the organized scheduling of a plurality of tasks using a software platform, in accordance with some embodiments.

FIG. 8 is a flowchart of a method to facilitate the organized scheduling of a plurality of tasks using a software platform, in accordance with some embodiments. The method discussed in relation to FIG. 8 can facilitate organized scheduling based on user interaction with billboards. Accordingly, the method may comprise a step 802 of receiving location data of at least one first user device associated with at least one first user. In one embodiment, location of the at least one user device may be determined using Global Positioning System (GPS). In one embodiment, the location of the at least one user device may be determined using at least one of wireless, wired or mobile network connections. In one embodiment, sensors present in the at least one user device may generate the location data.

In one embodiment, the digital billboard method may comprise a step 804 of analyzing the location data based on the receiving.

In one embodiment, the digital billboard method may comprise a step 806 of determining a billboard identifier based on analyzing the location data. The identifier may appear in digital format upon the Map Ad Landmarks. In one embodiment, the billboard identifier may be associated with at least one billboard present at a location. In one embodiment, the billboard identifier may be determined based on proximity of the at least one first user device from the at least one billboard using the location data.

In one embodiment, the digital billboard method may comprise a step 808 of retrieving billboard ad data based on determining the billboard identifier. The billboard ad data may appear in digital format as Map Ads. Further, the billboard ad data may comprise an advertisement associated with at least one business. In one embodiment, the at least one business may comprise restaurants, retailers, venues, service professionals, service providers, etc. In one embodiment, the advertisement may comprise promotional offers of events, products, services, etc. In one embodiment, the billboard ad data may comprise information associated with the at least one business. In one embodiment, the information may comprise flash sales advertisement, rotational sales advertisement, promotional advertisement, grand opening/closing advertisement, announcement advertisement, etc. In one embodiment, the billboard ad data may provide the at least one user with options for the at least one business. In one embodiment, the options may comprise a follow/unfollow option, a share option, a schedule option, a set reminder option, etc.

In one embodiment, the digital billboard method may comprise a step 810 of transmitting the billboard ad data to the at least one user device. In one embodiment, the billboard ad data may be displayed using an application on the at least one user device. In one embodiment, the at least one user may select one or more options associated with the billboard ad data from the application.

In one embodiment, the method may comprise a step 812 of providing one or more options associated with the billboard ad data.

In one embodiment, the method may comprise a step 814 of receiving a selection of the one or more options from the at least one first user device. The one or more options may comprise a follow/unfollow option, a share option, a schedule option, a reminder option, etc.

In one embodiment, the method may comprise a step 816 of performing, in response to the selection of the one or more options, an operation associated with a selected option. In one embodiment, the follow/unfollow option of the billboard ad data may comprise registering or deregistering the at least one user device for sending updates of the at least one business. In one embodiment, the share option of the billboard ad data may comprise to generate a shareable identifier. In one embodiment, the shareable identifier may comprise a web link, a location coordinate, etc. corresponding to the at least one business. In one embodiment, the at least one user may share the billboard ad data using the shareable identifier to another user. In one embodiment, the schedule option of the billboard ad data may generate schedule details. In one embodiment, the schedule details may comprise date, time and location details of an event associated with the at least one business. In one embodiment, the reminder option of the billboard ad data may comprise generation of reminders. In one embodiment, the reminders may comprise alerts, updates, notifications, etc. associated with certain offers, coupons, sales, products, events, etc. from the at least one business.

In one embodiment, the method may comprise a step 818 of transmitting operation data generated by the operation to the at least one first user device. For instance, the operation data may comprise the shareable identifiers, the schedule details, the reminders, etc. depending on the specific operation being performed. In one embodiment, the shareable identifier may be transmitted for the share option. In one embodiment, the schedule details may be transmitted for the schedule option. In one embodiment, the reminders may be transmitted for the reminder option.

Figure 9:
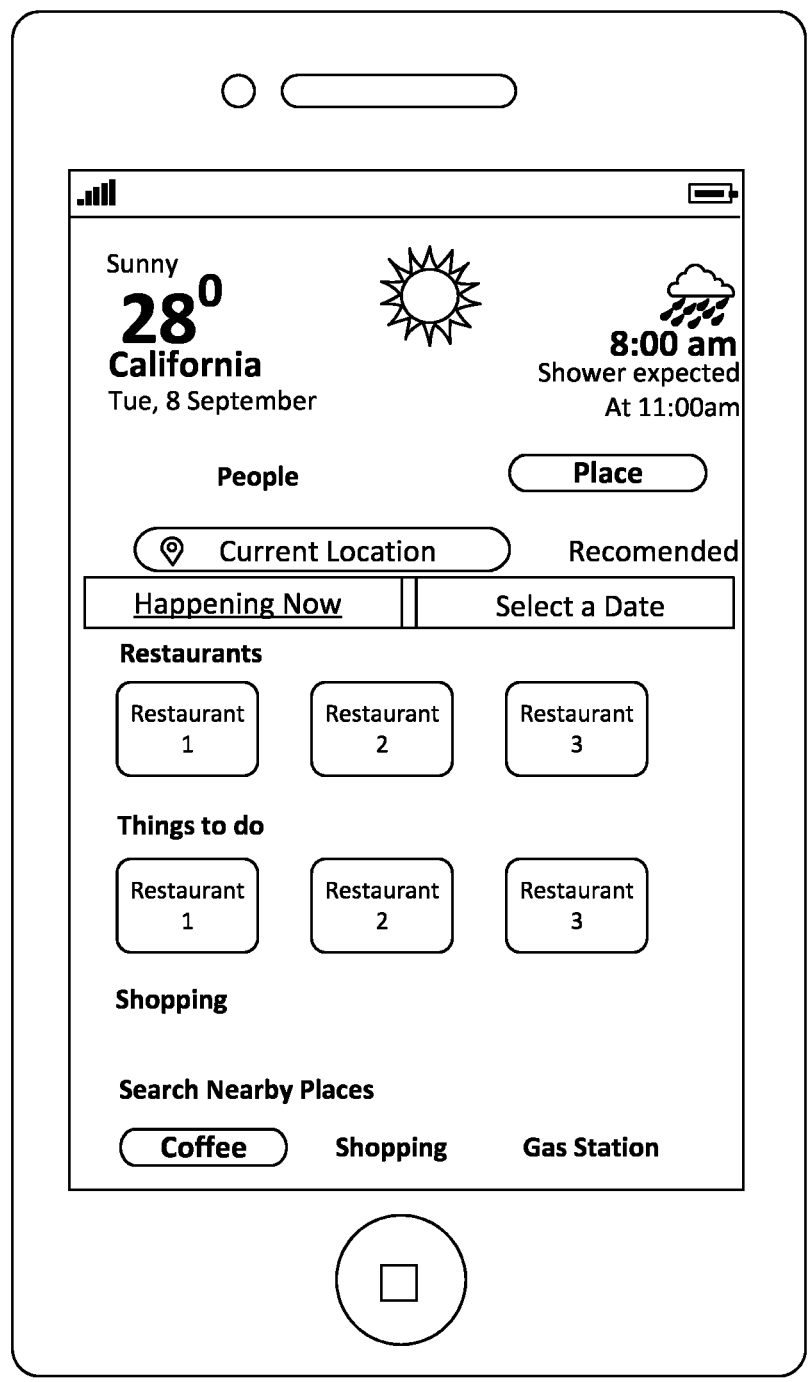
FIG. 9 is an exemplary illustration of a Current Location user interface associated with the software platform, in accordance with some embodiments.

FIG. 9 is an exemplary illustration of a Current Location user interface associated with the software platform, in accordance with some embodiments. Accordingly, the Current Location user interface may facilitate the display of the location of businesses. In one embodiment, the Current Location may be changed to display the location of another business despite the current location and entered by manual entry. In one embodiment, the user may input name, place, location, address, etc. of the other business. In one embodiment, the Current Location may display at least one event associated with any businesses that have an ad within the "happening now" ad category. In one embodiment, the user may unselect the "happening now" to display a Schedule A Place Later feature. In one embodiment, the Schedule A Place Later feature may display the chosen date on the calendar. In one embodiment, the user may modify the date to a future date, the time to a future time, and the location to a specific location or area all within the Schedule A Place Later feature.

Figure 10:
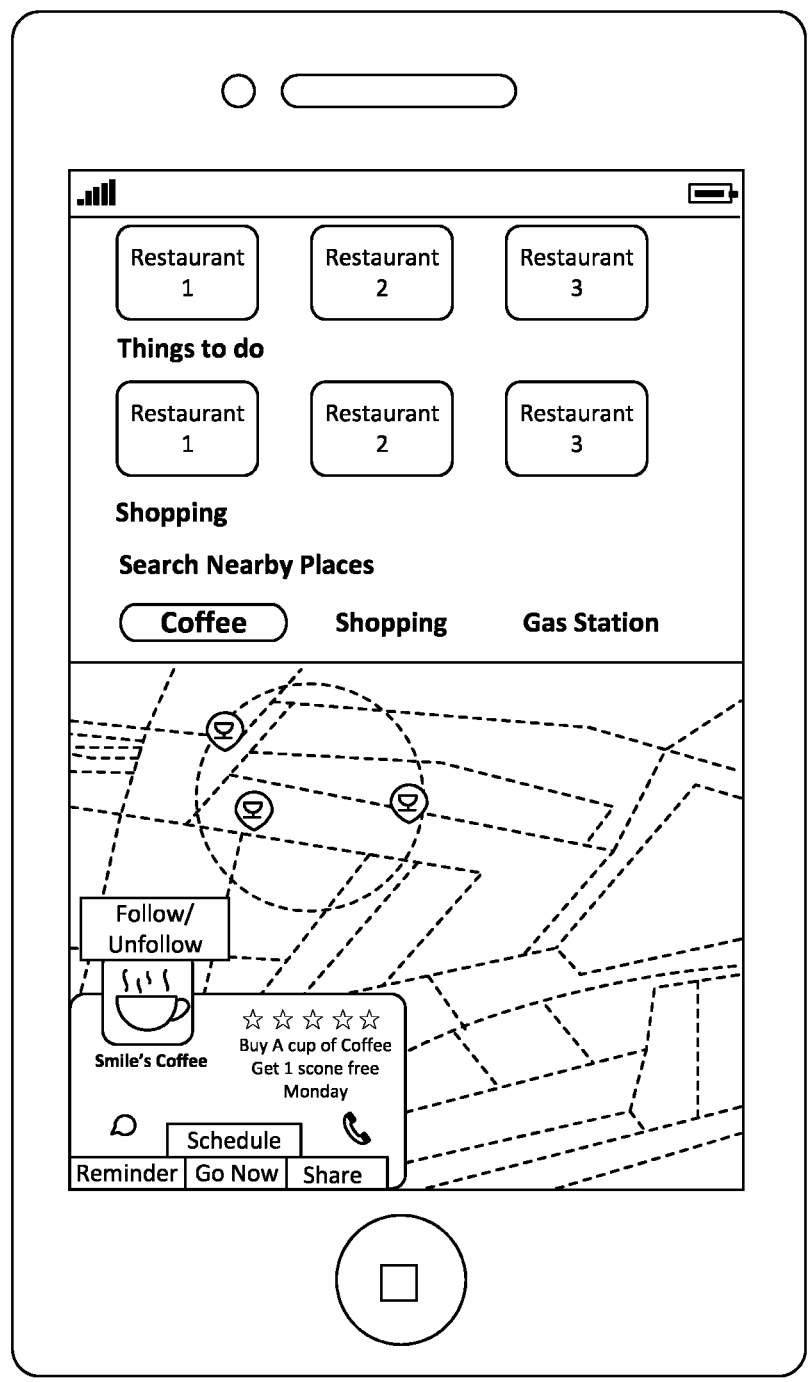
FIG. 10 is an exemplary illustration of a Recommended Ads user interface associated with the software platform, in accordance with some embodiments.

FIG. 10 is an exemplary illustration of a Recommended Ads user interface associated with the software platform, in accordance with some embodiments. Accordingly, the Recommended Ads user interface may facilitate the display of advertisements organized by user preferences. In one embodiment, the Recommended Ads may display paid advertisements related to followed businesses. In one embodiment, the user may remove the Recommended Ads. In one embodiment, the user may select at least one business category to adjust the user preference. In one embodiment, the Recommended Ads may display the advertisements corresponding to the at least one business category. In one embodiment, the user may select the at least one business category to follow or unfollow a business. In one embodiment, the user may schedule an event associated with the business by selecting the ad. In one embodiment, on selection of the ad, a user calendar may open. In one embodiment, the user calendar may provide three possibilities for scheduling an event. In one embodiment, the first possibility may comprise to schedule the event at that instant by inputting a date and a time. In one embodiment, the second possibility may comprise to schedule the event at a later time by setting a reminder for scheduling at another time. In one embodiment, the third possibility may comprise to "go now" for the event posted on the ad. In one embodiment, the Recommended Ads user interface may facilitate the user to share a particular ad associated with the business to another user. In one embodiment, Recommended Ads could be generated from the use of selected preset tasks within different schedule categories if the user allows for such setting for their recommended ads.

Figure 11:
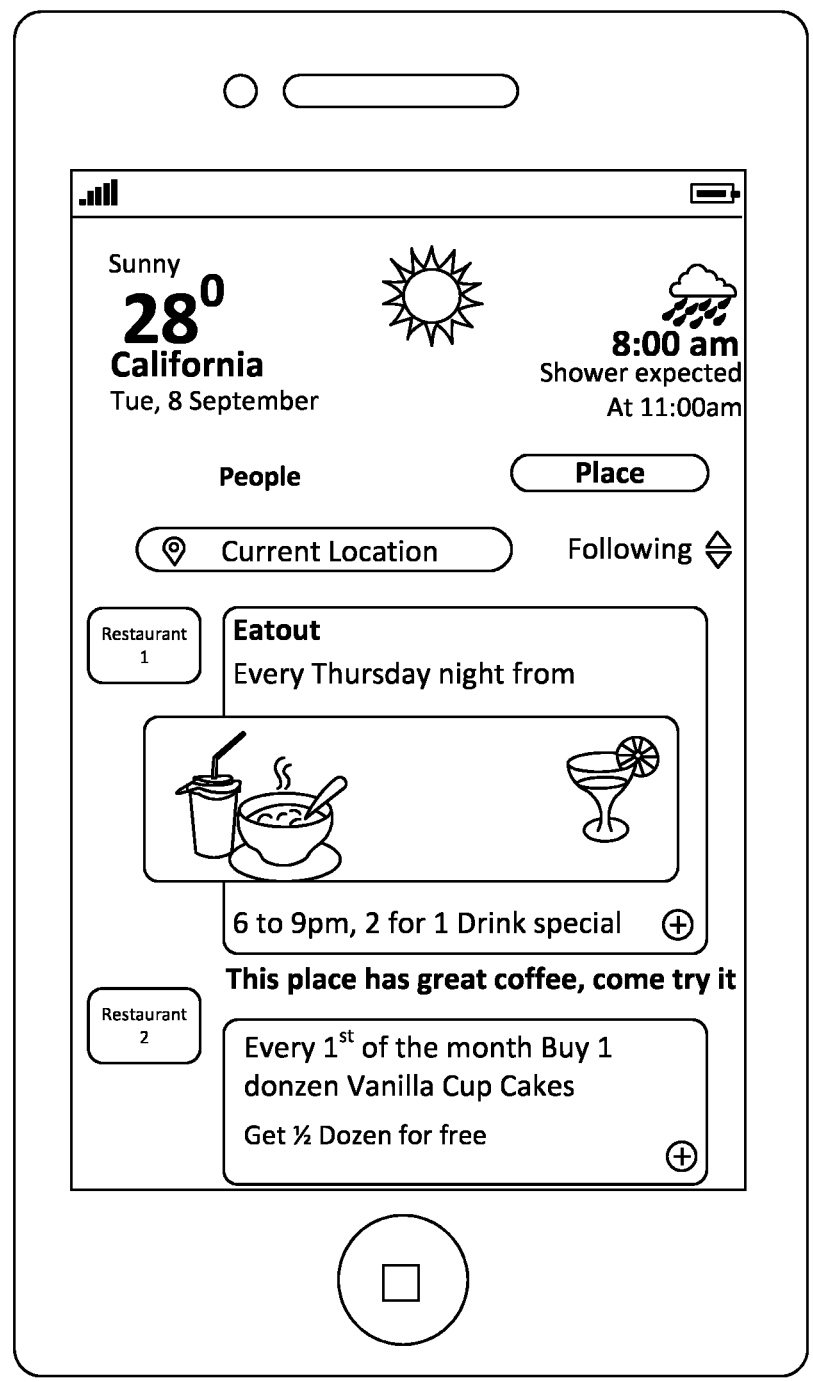
FIG. 11 is an exemplary illustration of an Ad Announcements user interface associated with the software platform, in accordance with some embodiments.

FIG. 11 is an exemplary illustration of an Ad Announcements user interface associated with the software platform, in accordance with some embodiments. Accordingly, the Ad Announcements user interface may facilitate the display of advertisements from all the businesses followed by the user. In one embodiment, the advertisements may comprise promotional offers of events, products, services, etc. provided by the businesses. In one embodiment, the Ad Announcements may display filter options to show advertisements associated with certain business categories. In one embodiment, the advertisements in the Ad Announcements may be selected to provide options to the user. In one embodiment, the options may comprise a call option, a message option, a schedule option, a reminder option, a share option, etc. In one embodiment, on selection of the call option, the software platform may provide at least one phone number associated with the business to make a call. In one embodiment, on selection of the message option, the user interface may open a message window to type messages for the user. In one embodiment, the messages may be received by the software platform for further transmission to the business. In one embodiment, on selection of the schedule option, the user interface may open a calendar and a clock to set a date and a time to provide a reminder of offers, coupons, sales, etc. associated with the business. In one embodiment, upon selection of the share option, there may be a web link, a picture, etc. of the business to share the advertisement with another user.

Further, the online platform disclosed in the present application may comprise a reward point system to enhance business and consumer relations. Consumers and clientele may act as promoters, social influentials, or may receive reward points as loyal customers. The reward point system may benefit users in receiving additional discounts or insured service.

Figure 12:
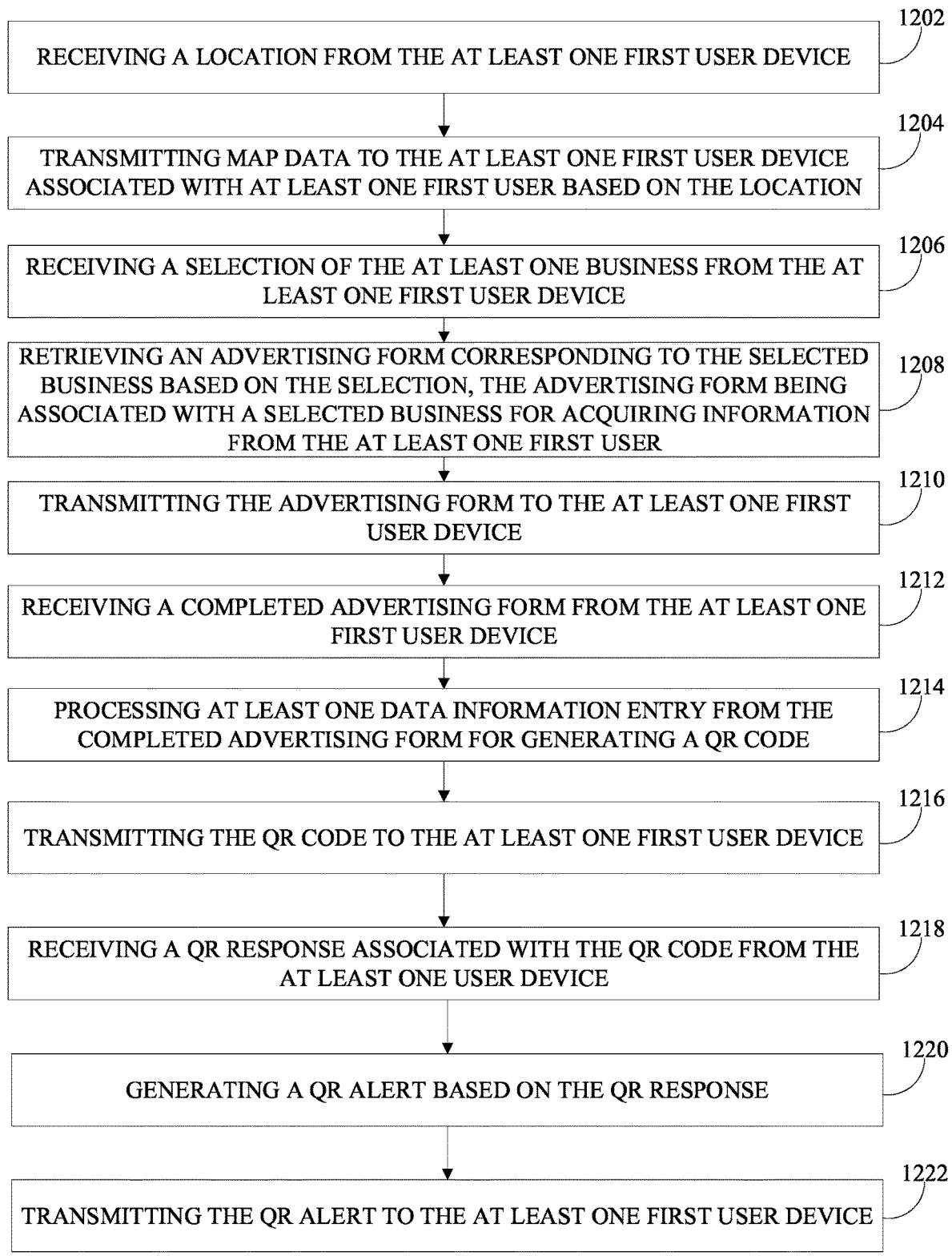
FIG. 12 is a flow chart of a method to facilitate the organized scheduling of a plurality of tasks using a software platform, in accordance with some embodiments.

FIG. 12 is a flow chart of a method to facilitate the organized scheduling of a plurality of tasks using a software platform, in accordance with some embodiments. The method discussed in relation to FIG. 12 can facilitate advertising and marketing promotional offers based on QR codes, from print and digital sources. Accordingly, the method may comprise a step 1202 of receiving a location from at least one first user device. In one embodiment, the location may be determined using Global Monitoring System (GPS).

In one embodiment, the method may comprise a step 1204 of transmitting map data to the at least one first user device associated with at least one first user based on the location. In one embodiment, the map data may be displayed on an application. In one embodiment, the application may comprise a digital map. In one embodiment, the map data may comprise marker data indicating at least one business location associated with at least one business. In one embodiment, the marker data may comprise at least one advertisement (Map Ads) associated with the at least one business. In one embodiment, the at least one business may comprise restaurants, retailers, venues, service professionals, service providers, etc. In one embodiment, the Map Ads may comprise an advertisement associated with the at least one business. In one embodiment, the advertisement may comprise promotional offers of events, products, services, etc. In one embodiment, the Map Ads may comprise information associated with the at least one business. In one embodiment, the information may comprise flash sales advertisement, rotational sales advertisement, promotional advertisement, grand opening/closing advertisement, announcement advertisement, etc.

In one embodiment, the method may comprise a step 1206 of receiving a selection of the at least one business from the at least one first user device. In one embodiment, the at least one user may comprise an individual, an institution, and an organization that may want to receive promotional offers associated with at least one business. In one embodiment, the at least one business may comprise an individual, an institution, and an organization that may want to advertise and market the promotional offers for the at least one user. In one embodiment, the at least one user device may comprise a desktop, a mobile, a tablet, a laptop, a personal computer, and so on.

In one embodiment, the method may comprise a step 1208 of retrieving an advertising form corresponding to the selected business based on the selection. In one embodiment, the advertising form may be associated with the selected business for acquiring information from the at least one first user.

In one embodiment, the method may comprise a step 1210 of transmitting the advertising form to the at least one first user device.

In one embodiment, the method may comprise a step 1212 of receiving a completed advertising form from the at least one first user device.

In one embodiment, the method may comprise a step 1214 of processing at least one data information entry from the completed advertising form for generating a QR code. In one embodiment, the QR code may be printed or shared digitally.

In one embodiment, the method may comprise a step 1216 of transmitting the QR code to the at least one first user device. In one embodiment, upon scanning the QR code, the user may be directed to download a social media application (such as the social media application that hosts and is affiliated with the QR features and functionality of such features which exists under the social media application) where a particular advertising promotion/deal may correspond to a particular type of calendar within the application.

In one embodiment, the method may comprise a step 1218 of receiving a QR response associated with the QR code from the at least one user device. In one embodiment, the QR response may be generated by the at least one user device upon scanning the QR code.

In one embodiment, the method may comprise a step 1220 of generating a QR alert based on the QR response. In one embodiment, the QR alert may comprise a text message alert and a sound alert. In one embodiment, the QR alert may remind the at least one user about at least one of the advertisements in which the at least one user may be interested. In one embodiment, the QR alert may be attached to a coupon/promo/announcement on the calendar associated with the at least one user.

In one embodiment, the method may comprise a step 1222 of transmitting the QR alert to the at least one first user device.

In one embodiment, the advertisement may comprise a limited advertisement that may be associated with an expiration date. In one embodiment, the QR alert may comprise an expiring soon tag associated with the limited advertisement.

Figure 13:
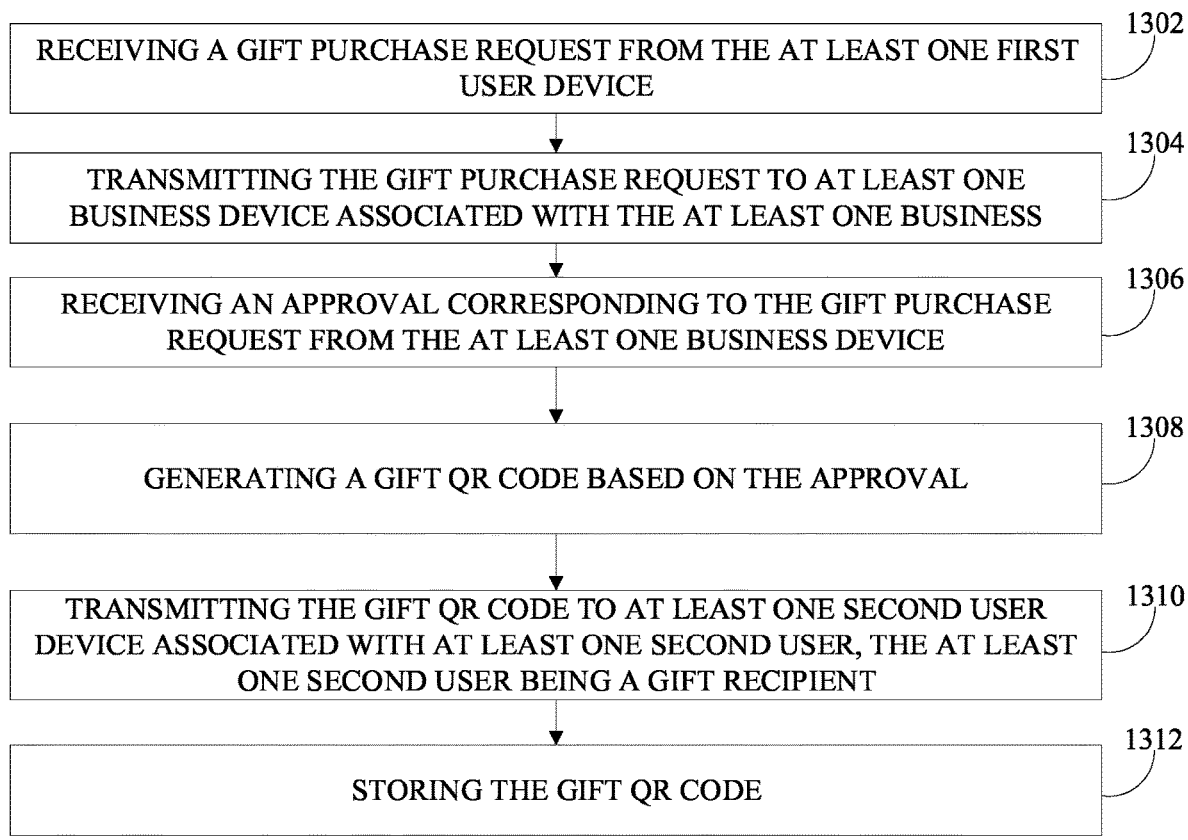
FIG. 13 is a flow chart of a method to facilitate the organized scheduling of a plurality of tasks using a software platform, in accordance with some embodiments.

FIG. 13 is a flow chart of a method to facilitate the organized scheduling of a plurality of tasks using a software platform, in accordance with some embodiments. The method discussed in relation to FIG. 13 can facilitate advertising and marketing promotional offers based on QR codes. Accordingly, the method may comprise a step 1302 of receiving a gift purchase request from the at least one first user device. In one embodiment, the gift purchase request may indicate that the at least one user may want to purchase a gift certificate that may be associated with the at least one business.

In one embodiment, the method may comprise a step 1304 of transmitting the gift purchase request to at least one business device associated with the at least one business.

In one embodiment, the method may comprise a step 1306 of receiving an approval corresponding to the gift purchase request from the at least one business device.

In one embodiment, the method may comprise a step 1308 of generating a gift QR code based on the approval.

In one embodiment, the method may comprise a step 1310 of transmitting the gift QR code to at least one second user device associated with at least one second user, the at least one second user being a gift recipient. In one embodiment, the at least one gift recipient may comprise an individual, an institution, and an organization to whom the at least one user may want to gift the gift QR code. In one embodiment, the gift QR code may be saved for the at least one gift recipient within a gift code calendar associated with the at least one gift recipient. In one embodiment, the gift code calendar may be a separate calendar that displays all places of business where the at least one gift recipient has received gift codes (such as the gift QR code).

In one embodiment, the method may comprise a step 1312 of storing the gift QR code.

Although the invention has been explained in relation to its preferred embodiment, it is to be understood that many other possible modifications and variations can be made without departing from the spirit and scope of the invention.

What is claimed is:

1. A system to facilitate organized scheduling of tasks, comprising:
 a communication device;
 a processing device;
 a storage device;
 the communication device being configured for receiving
  at least one schedule request from at least one first user
  device associated with at least one first user; the
  processing device being configured for:

analyzing the at least one schedule request to identify a schedule type, the schedule type comprising a plurality of categories associated with at least one task to be performed by the at least one first user; and retrieving at least one task preset associated with the plurality of categories of the schedule type;

the communication device being further configured for:

transmitting the at least one task preset to the at least one first user device; and receiving at least one task preset selection associated with the at least one task preset from the at least one first user device;

the processing device being further configured for generating at least one schedule reminder based on the at least one task preset selection;

the communication device being further configured for transmitting, based on the at least one schedule reminder, an alert to the at least one first user device;

the communication device being further configured for receiving a friend request from the at least one first user device;

the processing device being further configured for analyzing the friend request to identify at least one second user from a plurality of second users;

the communication device being further configured for:

transmitting the friend request to at least one second user device associated with the identified at least one second user;

receiving a confirmation corresponding to the friend request from the at least one second user device;

transmitting the at least one task preset to the at least one second user device;

receiving at least one task preset data associated with the at least one task preset from the at least one second user device; and transmitting, using the communication device, the at least one task preset data to the at least one first user device and the at least one second user device.

2. The system to facilitate organized scheduling of tasks as claimed in claim 1, further comprising:

the communication device being further configured for transmitting map data to the at least one first user device associated with the at least one first user, the map data comprising marker data indicating at least one business location associated with at least one business, and the marker data comprising at least one advertisement associated with the at least one business;

the processing device being further configured for providing one or more options associated with the at least one advertisement;

the communication device being further configured for receiving a selection of the one or more options from the at least one first user device;

the processing device being further configured for performing, in response to the selection of the one or more options, an operation associated with a selected option; and the communication device being further configured for transmitting operation data generated by the operation to the at least one user device.

3. The system to facilitate organized scheduling of tasks as claimed in claim 2, wherein the one or more options comprise a share option, a schedule option, and a reminder option.

4. The system to facilitate organized scheduling of tasks as claimed in claim 3, wherein the operation data generated by the operation comprises shareable identifiers, schedule details, and reminders.

5. The system to facilitate organized scheduling of tasks as claimed in claim 1, further comprising:

the communication device being further configured for receiving location data of the at least one first user device associated with the at least one first user;

the processing device being further configured for:

analyzing the location data based on the receiving;

determining, based on analyzing the location data, a billboard identifier associated with at least one billboard; and retrieving billboard ad data based on determining the billboard identifier, the billboard ad data comprising at least one advertisement associated with at least one business;

the communication device being further configured for transmitting the billboard ad data to the at least one first user device;

the processing device being further configured for providing one or more options associated with the billboard ad data;

the communication device being further configured for receiving a selection of the one or more options from the at least one first user device;

the processing device being further configured for performing, in response to the selection of the one or more options, an operation associated with a selected option; and the communication device being further configured for transmitting operation data generated by the operation to the at least one first user device.

6. The system to facilitate organized scheduling of tasks as claimed in claim 5, wherein the billboard identifier is determined based on proximity of the at least one first user device from the at least one billboard.

7. The system to facilitate organized scheduling of tasks as claimed in claim 6, wherein the one or more options comprise a share option, a schedule option, and a reminder option, and the operation data generated by the operation comprises shareable identifiers, schedule details, and reminders.

8. The system to facilitate organized scheduling of tasks as claimed in claim 1, further comprising:

the communication device being further configured for:

receiving a location from the at least one first user device;

transmitting map data to the at least one first user device associated with at least one first user based on the location; and receiving a selection of the at least one business from the at least one first user device;

the processing device being further configured for retrieving an advertising form corresponding to the selected business based on the selection, the advertising form being associated with a selected business for acquiring information from the at least one first user;

the communication device being further configured for:

transmitting the advertising form to the at least one first user device;

receiving a completed advertising form from the at least one first user device; and the processing device being further configured for processing at least one data information entry from the completed advertising form for generating a quick response (QR) code;
the communication device being further configured for:
   transmitting the QR code to the at least one first user device; and
   receiving a QR response associated with the QR code from the at least one user device;
the processing device being further configured for generating a QR alert based on the QR response; and
the communication device being further configured for transmitting the QR alert to the at least one first user device.

9. The system to facilitate organized scheduling of tasks as claimed in claim 8, further comprising:
the communication device being further configured for:
   receiving a gift purchase request from the at least one first user device;
   transmitting the gift purchase request to at least one business device associated with the at least one business; and
   receiving an approval corresponding to the gift purchase request from the at least one business device
the processing device being further configured for generating a gift QR code based on the approval;
the communication device being further configured for transmitting the gift QR code to at least one second user device associated with at least one second user, the at least one second user being a gift recipient; and
the storage device being configured for storing the gift QR code.

10. A method to facilitate organized scheduling of tasks, comprising the steps of:
Receiving, using a communication device, at least one schedule request from at least one first user device associated with at least one first user;
Analyzing, using a processing device, the at least one schedule request to identify a schedule type, the schedule type comprising a plurality of categories associated with at least one task to be performed by the at least one first user;
Retrieving, using the processing device, at least one task preset associated with the plurality of categories of the schedule type;
Transmitting, using the communication device, the at least one task preset to the at least one first user device;
receiving, using the communication device, at least one task preset selection associated with the at least one task preset from the at least one first user device;
generating, using the processing device, at least one schedule reminder based on the at least one task preset selection;
transmitting, based on the at least one schedule reminder, an alert to the at least one first user device, using the communication device;
receiving, using the communication device, a friend request from the at least one first user device;
analyzing, using the processing device, the friend request to identify at least one second user from a plurality of second users;
transmitting, using the communication device, the friend request to at least one second user device associated with the identified at least one second user;
receiving, using the communication device, a confirmation corresponding to the friend request from the at least one second user device;
transmitting, using the communication device, the at least one task preset to the at least one second user device;
receiving, using the communication device, at least one task preset data associated with the at least one task preset from the at least one second user device; and
transmitting, using the communication device, the at least one task preset data to the at least one first user device and the at least one second user device.

11. The method to facilitate organized scheduling of tasks as claimed in claim 10, further comprising:
transmitting, using the communication device, map data to at least one first user device associated with at least one first user, the map data comprising marker data indicating at least one business location associated with at least one business, and the marker data comprising at least one advertisement associated with the at least one business;
providing, using the processing device, one or more options associated with the at least one advertisement;
receiving, using the communication device, a selection of the one or more options from the at least one first user device;
performing, in response to the selection of the one or more options, an operation associated with a selected option, using the processing device; and
transmitting, using the communication device, operation data generated by the operation to the at least one user device.

12. The method to facilitate organized scheduling of tasks as claimed in claim 11, wherein the one or more options comprise a share option, a schedule option, and a reminder option.

13. The method to facilitate organized scheduling of tasks as claimed in claim 12, wherein the operation data generated by the operation comprises shareable identifiers, schedule details, and reminders.

14. The method to facilitate organized scheduling of tasks as claimed in claim 10, further comprising:
Receiving, using the communication device, location data of the at least one first user device associated with the at least one first user;
analyzing using the processing device, the location data based on the receiving;
determining, based on analyzing the location data, a billboard identifier associated with at least one billboard, using the processing device;
retrieving, using the processing device, billboard ad data based on determining the billboard identifier, the billboard ad data comprising at least one advertisement associated with at least one business;
transmitting, using the communication device, the billboard ad data to the at least one first user device;
providing, using the processing device, one or more options associated with the billboard ad data;
receiving, using the communication device, a selection of the one or more options from the at least one first user device;
performing, in response to the selection of the one or more options, an operation associated with a selected option, using the processing device; and
transmitting, using the communication device, operation data generated by the operation to the at least one first user device.

15. The method to facilitate organized scheduling of tasks as claimed in claim 14, wherein the billboard identifier is determined based on proximity of the at least one first user device from the at least one billboard.

16. The method to facilitate organized scheduling of tasks as claimed in claim 15, wherein the one or more options comprise a share option, a schedule option, and a reminder option, and the operation data generated by the operation comprises shareable identifiers, schedule details, and reminders.

17. The method to facilitate organized scheduling of tasks as claimed in claim 10, further comprising:
- receiving, using the communication device, a location from the at least one first user device;
- transmitting, using the communication device, map data to the at least one first user device associated with at least one first user based on the location;
- receiving, using the communication device, a selection of the at least one business from the at least one first user device;
- retrieving, using the processing device, an advertising form corresponding to the selected business based on the selection, the advertising form being associated with a selected business for acquiring information from the at least one first user;
- transmitting, using the communication device, the advertising form to the at least one first user device;
- receiving, using the communication device, a completed advertising form from the at least one first user device;
- processing, using the processing device, at least one data information entry from the completed advertising form for generating a quick response (QR) code;
- transmitting, using the communication device, the QR code to the at least one first user device;
- receiving, using the communication device, a QR response associated with the QR code from the at least one user device;
- generating, using the processing device, a QR alert based on the QR response; and transmitting, using the communication device, the QR alert to the at least one first user device.

18. The method to facilitate organized scheduling of tasks as claimed in claim 17, further comprising:
- receiving, using the communication device, a gift purchase request from the at least one first user device;
- transmitting, using the communication device, the gift purchase request to at least one business device associated with the at least one business;
- receiving, using the communication device, an approval corresponding to the gift purchase request from the at least one business device;
- generating, using the processing device, a gift QR code based on the approval;
- transmitting, using the communication device, the gift QR code to at least one second user device associated with at least one second user, the at least one second user being a gift recipient; and
- storing, using a storage device, the gift QR code.

* * * * *